(12) United States Patent
Cory

(10) Patent No.: US 6,970,013 B1
(45) Date of Patent: Nov. 29, 2005

(54) VARIABLE DATA WIDTH CONVERTER

(75) Inventor: Warren E. Cory, Redwood City, CA (US)

(73) Assignee: Xilinx, INC, San Jose, CA (US)

( * ) Notice: Subject to any disclaimer, the term of this patent is extended or adjusted under 35 U.S.C. 154(b) by 202 days.

(21) Appl. No.: 10/648,121

(22) Filed: Aug. 25, 2003

Related U.S. Application Data

(63) Continuation-in-part of application No. 10/618,146, filed on Jul. 11, 2003, which is a continuation of application No. 10/090,286, filed on Mar. 1, 2002, now Pat. No. 6,617,877.

(51) Int. Cl.⁷ .......................................... H03K 19/177
(52) U.S. Cl. ......................................... 326/38; 326/41
(58) Field of Search ................................. 326/37–41

(56) References Cited

U.S. PATENT DOCUMENTS

| | | | |
|---|---|---|---|
| 5,361,373 A | 11/1994 | Gilson | |
| 5,537,601 A | 7/1996 | Kimura et al. | |
| 5,652,904 A | 7/1997 | Trimberger | |
| 5,671,355 A | 9/1997 | Collins | |
| 5,752,035 A | 5/1998 | Trimberger | |
| 5,970,254 A | 10/1999 | Cooke et al. | |
| 6,020,755 A | 2/2000 | Andrews et al. | |
| 6,096,091 A | 8/2000 | Hartmann | |
| 6,279,045 B1 | 8/2001 | Muthujumaraswathy et al. | |
| 6,282,627 B1 | 8/2001 | Wong et al. | |
| 6,343,207 B1 | 1/2002 | Hessel et al. | |
| 6,650,141 B2 * | 11/2003 | Agrawal et al. | 326/41 |
| 6,744,274 B1 * | 6/2004 | Arnold et al. | 326/16 |
| 6,856,167 B2 * | 2/2005 | Ozguz et al. | 326/41 |

OTHER PUBLICATIONS

U.S. Appl. No. 10/090,250, filed Mar. 1, 2002, Menon et al.
Cary D. Snyder and Max Baron; "Xilinx's A-to-Z System Platform"; Cahners Microprocessor; The Insider's Guide to Microprocessor Hardware; Microdesign Resources; Feb. 6, 2001; pp. 1-5.
Xilinx, Inc.; "Virtex-II Platform FPGA Handbook"; published Dec. 2000, available from Xilinx, Inc,, 2100 Logic Drive, San Jose, California 95124; pp. 33-75.

* cited by examiner

Primary Examiner—Don Le
(74) Attorney, Agent, or Firm—Kim Kanzaki

(57) ABSTRACT

An integrated circuit (IC) with programmable circuitry having programmable functions and programmable interconnections. The IC further includes: a first module having an output with a first fixed data width or first variable data width; a second module having an input with a second fixed data width or a second variable data width; and a data width converter receiving data from the output of the first module and sending the data to the input of the second module, the data width converter configured to convert data from the first fixed data width or first variable data width to the second fixed data width or the second variable data width.

16 Claims, 18 Drawing Sheets

VARIABLE DATA WIDTH CONVERTER

BACKGROUND OF THE INVENTION

1. Field of the Invention

The present invention relates to an integrated circuit (IC) having circuitry with programmable functions and programmable interconnections. More specifically, the present invention relates to a method and apparatus for converting to and from variable-width data paths.

2. Related Art

In the past, multi-gigabit transceivers (MGTs) have not been included on programmable logic devices (PLDs) for various reasons, where a PLD is any IC which has programmable functions and programmable interconnections. However, commonly owned, copending U.S. patent application Ser. No. 10/090,250 filed on Mar. 1, 2002 entitled "High Speed Configurable Transceiver Architecture" by Suresh M. Menon et al., describes the manner in which MGTs can be included on a PLD, such as a field programmable gate array (FPGA). It would therefore be desirable to optimize the data paths between the core logic of a PLD and the MGTs located on the PLD.

PLD commonly includes one or more data paths, or collections of digital signals routed through the system during processing. The size of a collection, called the "data width" or "data path width" herein, depends on a number of factors. One factor in determining the data path width is the significance of the signals (i.e., the information that the signals represent, and the format of the signals). Another factor is the required speed of operation of the design. Yet another factor is the size constraints introduced by the design. Other factors may also possibly affect the data path width.

In some cases, it may be desirable to modify the width of a data path at some point in the design, changing the extent to which data is propagated in parallel. This may be necessary, for example, because of: different operating speeds in different portions of the design, or different constraints on the data width in different portions of the design. It may also be beneficial for this data width modification to be programmable and to be done dynamically.

It would therefore be desirable to have a PLD capable of implementing a variable-width data path.

SUMMARY

The present invention provides a method and system for converting data on a first bus of a first fixed or variable width to data on a second bus of a second fixed or variable width. An exemplary embodiment of the present invention includes: an integrated circuit (IC) with programmable circuitry having programmable functions and programmable interconnections. The IC further includes: a first module having an output with a first fixed data width or first variable data width; a second module having an input with a second fixed data width or a second variable data width; and a data width converter receiving data from the output of the first module and sending the data to the input of the second module, the data width converter configured to convert data from the first fixed data width or first variable data width to the second fixed data width or the second variable data width, where the first fixed data width is not equal to the second fixed data width.

An embodiment of the present invention provides an integrated circuit (IC) including: programmable circuitry having programmable functions and programmable interconnections, where the programmable circuitry includes a first transmit port having a first fixed data width or a first variable data width, and a first receive port having a second fixed data width or a second variable data width; a transceiver with a second transmit port having a third fixed data width or a third variable data width, and a second receive port having a fourth fixed data width or a fourth variable data width; a transmit converter coupling the first transmit port of the programmable circuitry and the second receive port of the transceiver, where the transmit converter is operably configured to convert the first fixed data width to the fourth variable data width, the first variable data width to the fourth fixed data width, or the first variable data width to the fourth variable data width; and a receive converter coupling the first receive port of the programmable circuitry and the second transmit port of the transceiver. The IC may also have the receive converter operably configured to convert the third fixed data width to the second variable data width, the third variable data width to the second fixed data width, or the third variable data width to the second variable data width.

Further, in another embodiment, the transmit converter couples the first transmit port of the programmable circuitry and the second receive port of the transceiver, where the transmit converter is operably configured to convert the first fixed data width to the fourth fixed data width; and the receive converter couples the first receive port of the programmable circuitry and the second transmit port of the transceiver. The receive converter operably configured to convert the fourth fixed data width to the second fixed data width.

The present invention will be more fully understood in view of the following description and drawings.

BRIEF DESCRIPTION OF THE DRAWINGS

FIG. 2-1 is a block diagram of a multi-gigabit transceiver and variable-width interface in accordance with one embodiment of the present invention.

FIG. 2-2 is a block diagram of another embodiment of the present invention;

FIG. 2-3 is a block diagram of yet another embodiment of the present invention;

DETAILED DESCRIPTION

Figure 1:
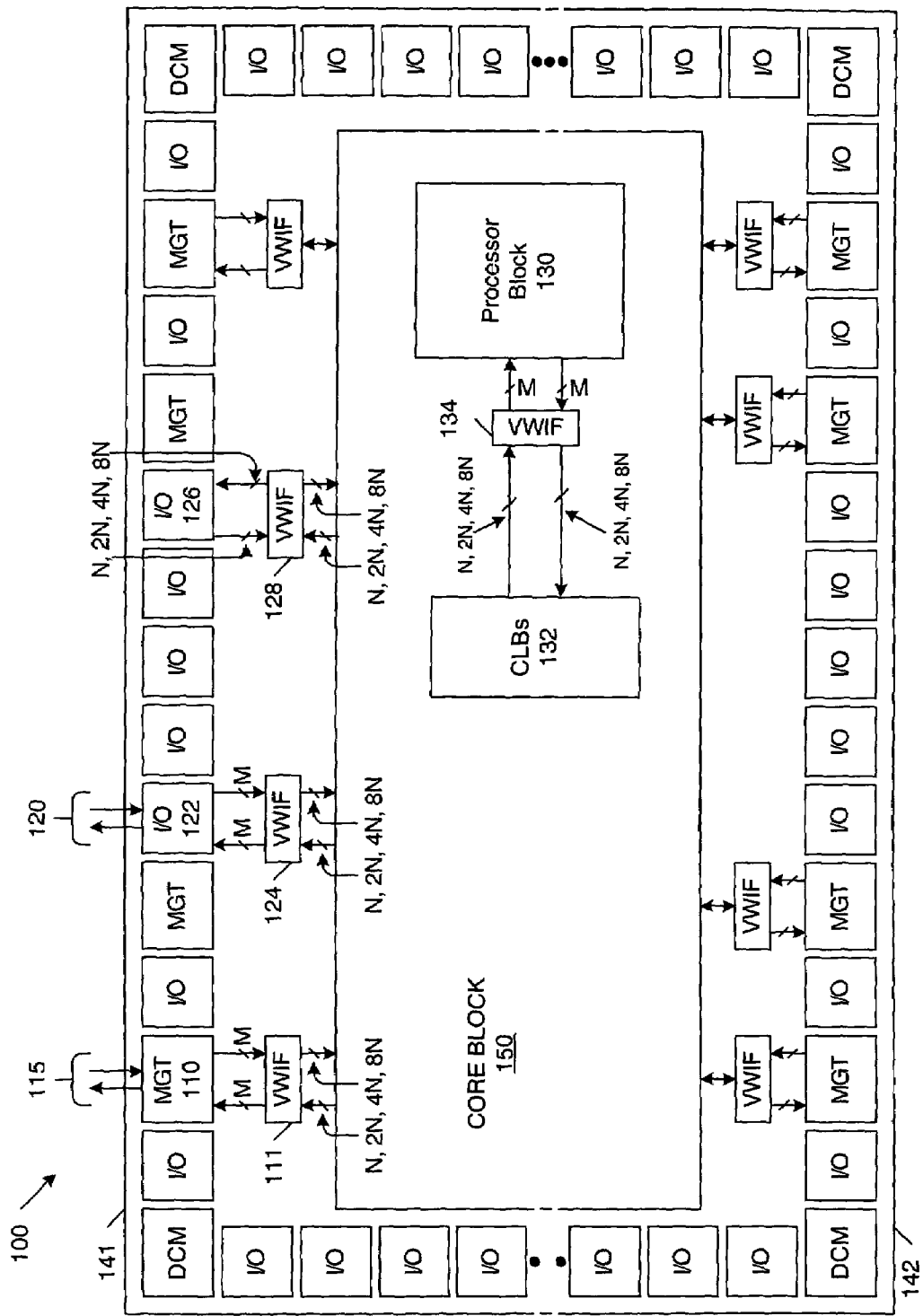
FIG. 1 is a block diagram of a programmable logic device in accordance with one embodiment of the present invention.

FIG. 1 is a block diagram of a programmable logic device (PLD) 100 in accordance with one embodiment of the present invention. In the described embodiment, PLD 100 is a field programmable gate array (FPGA) that includes select I/O blocks (labeled I/O), digital clock managers (labeled DCM) and multi-gigabit transceivers (labeled MGT) located around the perimeter of the device. Each MGT includes a full-duplex differential data channel, such as channel 115. PLD 100 also includes core block 150, which includes an array of configurable logic blocks (CLBs), programmable routing circuitry, and optional embedded hardwire circuitry, for example, processor block 130, in the described embodiment. Variable-width interface circuits (labeled VWIF) are located between each of the MGTs and core block 150. Select I/O blocks I/O, digital clock managers DCM and core block 150 are well known to those of ordinary skill in the art. These conventional elements of PLD 100 are described in detail in "Virtex™-II Platform FPGA Handbook", December 2000, pages 33–75, and in the Virtex II Pro™ Platform FPGA Handbook, October 2002, available from Xilinx Inc., 2100 Logic Drive, San Jose, Calif. 95124.

PLDs, such as FPGAs, have not previously included multi-gigabit transceivers or variable-width interfaces. As described in more detail below, some of the variable-width interfaces (VWIFs) enables a data path between core block 150 and the corresponding MGT to have a selectable data path width. For example, variable-width interface VWIF 111 enable data paths to core block 150 having widths of N, 2N, 4N or 8N, where N is an integer. Both the transmit and receive data paths between VWIF 111 and MGT 110 have widths equal to M, where M is an integer. In the examples described below, M is equal to 2N, although this is not necessary.

In other embodiments of the present invention, the VWIFs may connect the core block 150 to I/Os, e.g., 122 and 124, and/or a processor block 130 to one or more CLBs 132 in the core block 150. VWIF 124 has data paths to/from core block 150 having variable widths of N, 2N, 4N or 8N and data paths to/from I/O 122 having fixed data width M. VWIF 128 has data paths to/from core block 150 having variable widths of N, 2N, 4N or 8N and data paths to/from I/O 122 having variable widths of N, 2N, 4N or 8N. VWIF 134 has data paths to/from CLBs 132 in core block 150 having variable widths of N, 2N, 4N or 8N and data paths to/from processor block 130, embedded in core block 150, having fixed data width M. In yet other embodiments processor block 130 may be replaced by a digital signal processor (DSP), a Block random access memory (BRAM), RAM, non-volatile memory, one or more CLBs, and application specific integrated circuit or other hardwired circuitry.

Figures 1, 2:
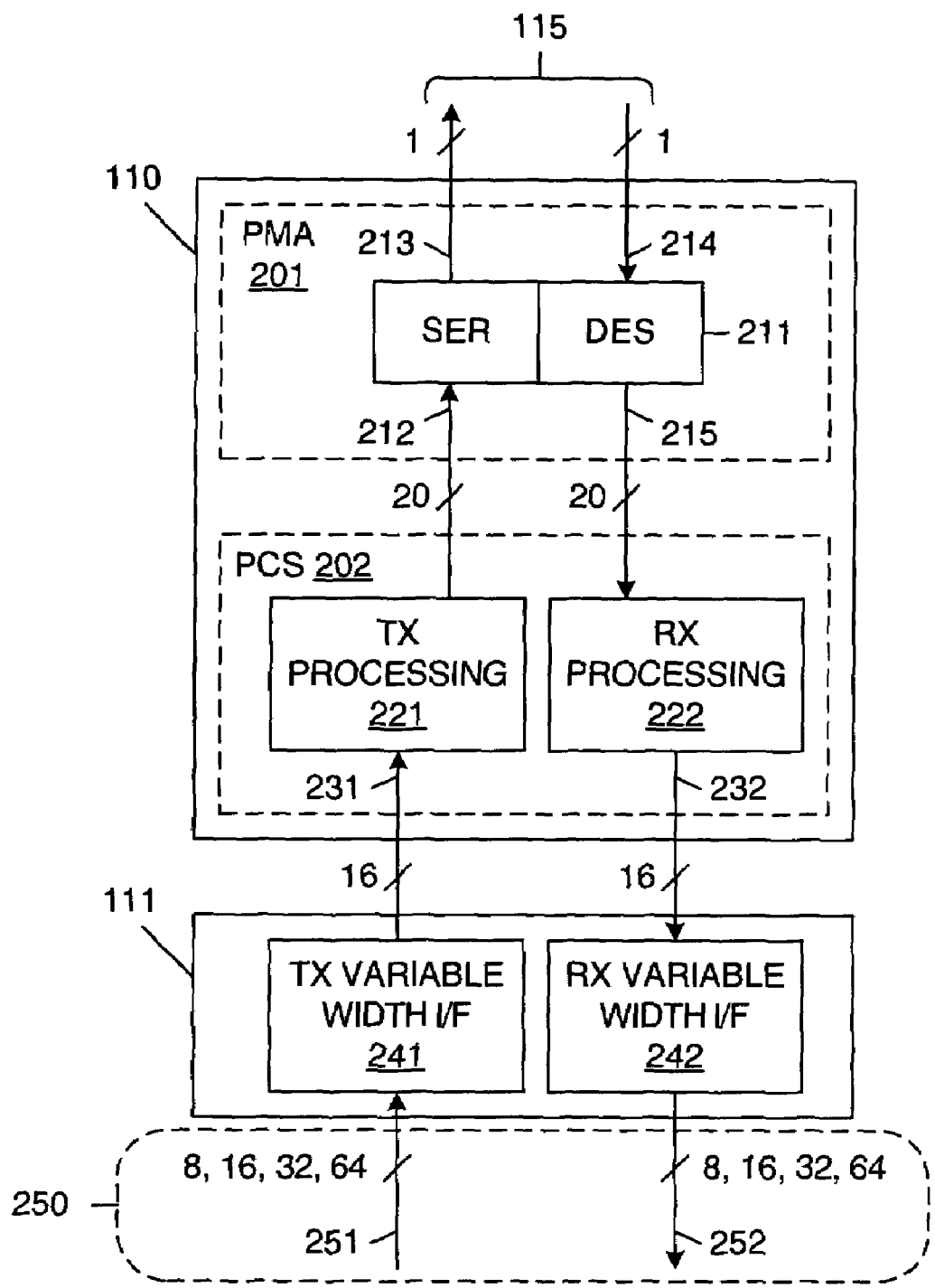
Figure 2:
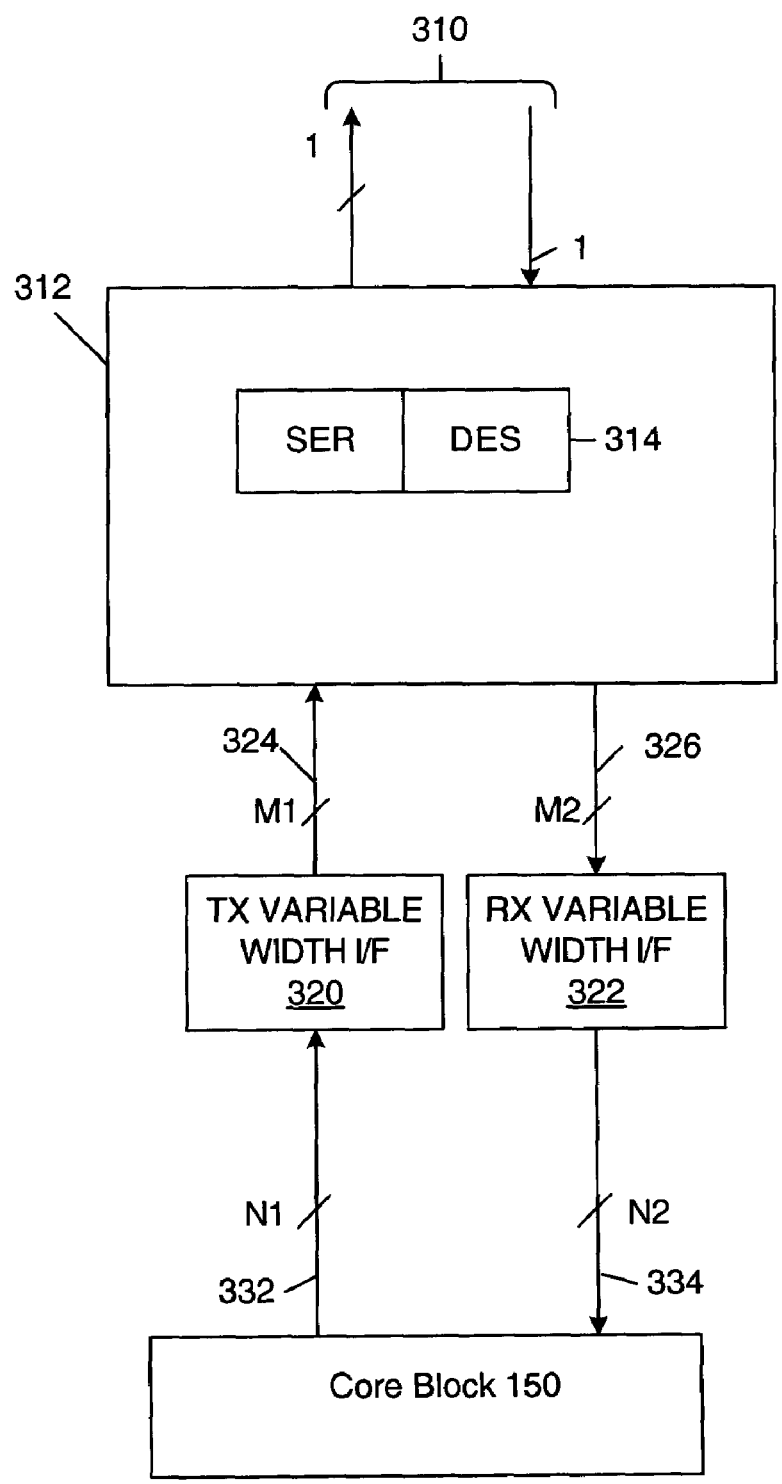

FIG. 2-1 is a block diagram illustrating multi-gigabit transceiver 110 and variable-width interface 111 in accordance with one embodiment of the present invention. MGT 110 includes a physical media access (PMA) sublayer 201, which includes a serializer/deserializer (SERDES) 211 having a 20-bit wide serializer data input port 212, a 1-bit wide serializer data output port 213, a 1-bit wide deserializer data input port 214, and a 20-bit wide deserializer data output port 215. MGT 110 also includes a physical coding sublayer (PCS) 202, which includes transmit processing block 221 and receive processing block 222 coupled to the 20-bit wide serializer data input port 212 and the 20-bit wide deserializer data output port 215, respectively. Although MGTs have not previously been included on programmable logic devices, the various elements of MGTs are well known to those of ordinary skill in the art.

Transmit processing block 221 includes a 16-bit wide transmit data input bus 231, and receive processing block 222 includes a 16-bit wide receive data output bus 232. Thus, in the described embodiment, M is equal to 16. The widths of transmit data input bus 231 and receive data output bus 232 are fixed in the described embodiment. Transmit data input bus 231 and receive data output bus 232 are coupled to variable-width interface 111. More specifically, transmit data input bus 231 is coupled to transmit variable-width interface 241, and receive data output bus 232 is coupled to receive variable-width interface 242. Both transmit variable-width interface 241 and receive variable-width interface 242 are coupled to the programmable interconnect resources 250 of core block 150.

In accordance with one embodiment, variable-width interface 111 supports a variable-width transmit data path 251, which is created from programmable interconnect resources 250, having a width of 8-bits, 16-bits, 32-bits or 64-bits. Similarly, variable-width interface 111 supports a variable-width receive data path 252, which is created from programmable interconnect resources 250, having a width of 8-bits, 16-bits, 32-bits or 64-bits. Thus, in the described embodiment, N is equal to 8. The variable-width data paths 251–252 can be controlled to have the same width, or different widths, in different embodiments of the present invention. Advantageously, the variable-width data paths 251–252 can have a smaller width, the same width, or a wider width with respect to the width of data paths 231–232. This provides flexibility in operating PLD 100.

Simplified representations of transmit variable-width interface 241 and receive variable-width interface 242 will now be described in more detail. As described above, M is equal to 16 and N is equal to 8 in the example illustrated by FIG. 2-1. However, the following simplified examples describe a transmit variable-width interface and a receive variable-width interface having a width M equal to two and a width N equal to 1. Given these examples, one of ordinary skill can easily expand these interfaces to create larger interfaces, such as the one defined by FIG. 2-1. With N equal to 1, variable-width data paths 251–252 can have widths equal to 1-bit, 2-bits, 4-bits and 8-bits. With M equal to 2, fixed-width data paths 231–232 have widths equal to 2-bits. FIGS. 3A, 3B, 3C and 3D show the clock waveforms (CLK1248) used to control the variable-width 1-bit, 2-bit, 4-bit and 8-bit data paths, respectively, as well as the clock waveform (CLK2) used to control the fixed-width 2-bit data paths within variable-width interface 111. The waveforms shown in FIGS. 3K–3D indicate not only the relative frequencies of the two clock signals CLK2 and CLK1248, but also their phase relationship.

The described design assumes that all flip-flops (described below) in transmit variable-width interface 241 and receive variable-width interface 242 are positive edge triggered. The described design also assumes that in order to eliminate flip-flop hold time as a critical design issue, it is required that rising (positive) edges of the CLK2 and CLK1248 signals are not aligned. The latter requirement is met by defining the clock waveforms CLK2 and CLK1248 such that the rising edges of the slower clock signal are aligned with falling edges of the faster clock signal. In the case of the 2-bit data path (FIG. 3B), either clock signal CLK2 or clock signal CLK1248 may be regarded as the "faster" or "slower" clock signal for the purpose of this requirement.

An alternative embodiment of FIG. 2-1 is shown in FIG. 2-2. The MGT 110 of FIG. 2-1 is replaced by a transceiver 312 having a SERDES circuit 314. The transceiver 312 is any conventional transceiver as known to one of ordinary skill in the arts. There is a 1-bit serial input and a 1-bit serial output into/out of transceiver 312 as shown by label 310. Data bus or data path 324 has a width of M1 bits. Data bus or data path 326 has a width of M2 bits. M1 and M2 are positive integers. Data buses 324 and 326 may have fixed or variable widths and may be created using programmable interconnect resources. Data bus 324 is coupled to transmit (TX) variable-width interface (I/F) 320 (similar to TX variable-width I/F 241), and data bus 326 is coupled to receive (RX) variable-width interface (I/F) 322 (similar to RX variable-width I/F 242). Both transmit variable-width interface 320 and receive variable-width interface 322 are coupled to core block 150 via the programmable interconnect resources that create data bus 332 with width of N1 bits and data bus 334 with width of N2 bits, where N1 and N2 are positive integers.

In one example of the alternative embodiment, N1 equals N2, and N1 has a width selectable from a group having widths of 8-bits, 16-bits, 32-bits, and 64-bits. M1 equals M2, and M1 has a width selectable from a group having widths of 16-bits and 32-bits. The TX Variable Width I/F 320 and the RX Variable Width I/F 322 may be included in core block 150, and data buses 324 and/or 326 may be created from programmable interconnect resources to be either 16 or 32 bits. In other embodiments, M1, M2, N1 and N2 have various combinations of positive integers and fixed or variable data widths. In an alternative embodiment the TX Variable Width I/F 320 and the RX Variable Width I/F 322 may be hardwired circuitry. In yet another embodiment, the TX Variable Width I/F 320 and the RX Variable Width I/F 322 may be combined into one module, buses 324 and 326 may be combined into a bi-directional bus, and buses 332 and 334 may be combined into another bi-directional bus.

Figures 2, 3:
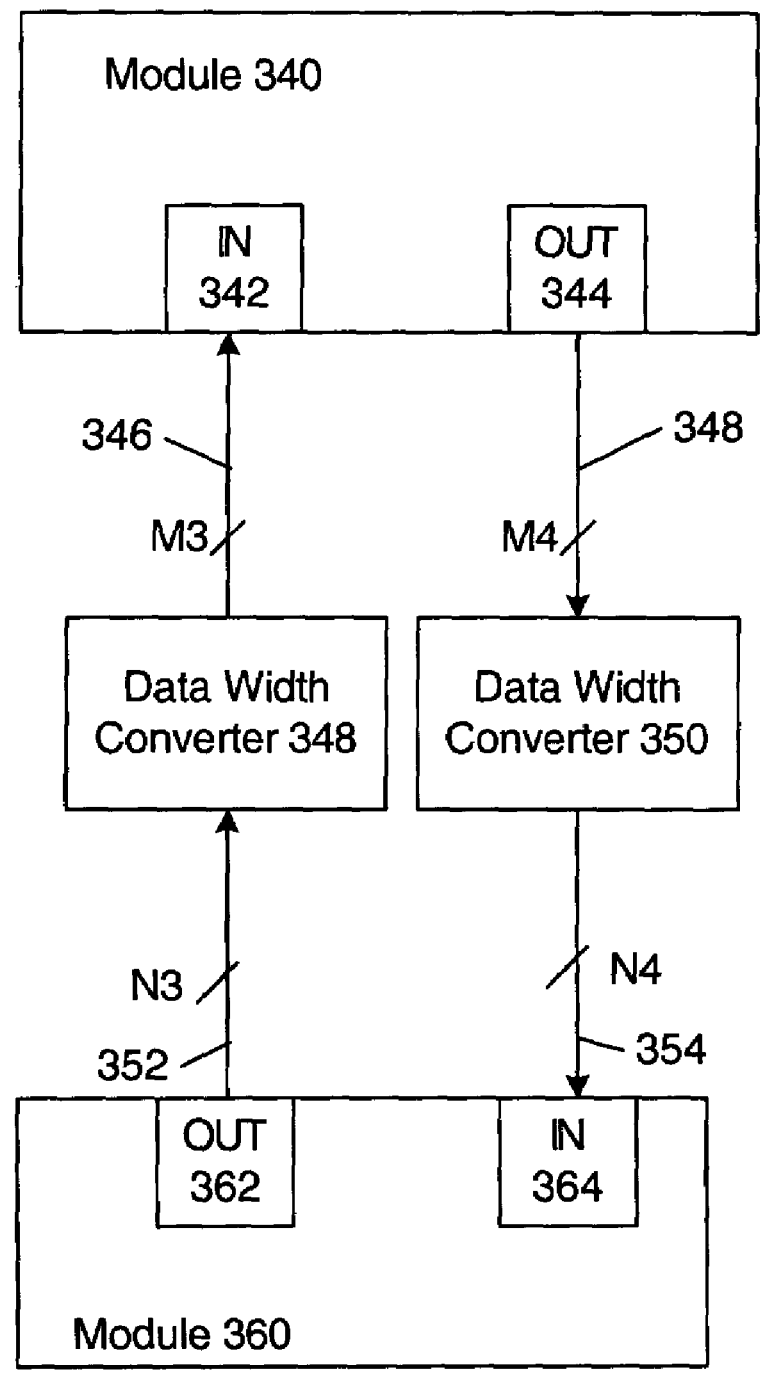

Yet another embodiment of the present invention is shown in FIG. 2-3. Two modules 340 and 360 are connected together by data width converters 348 and 350. The modules 340 and 360 and data width converters 348 and 350 are located on an integrated circuit having programmable logic and programmable interconnections. Modules 340 and 360, for example, may include CLBs, serdes circuitry, a transceiver, an I/O module, an embedded microprocessor core, a hardwired digital signal processing core, or other programmable and/or hardwired circuitry. The data width converters 348 and 350 may be hardwired or formed using programmable logic. In addition the data width converters 348 and 350 may be combined into one data width converter circuit. Also buses 346 and 348 may be combined into one bi-directional bus and buses 352 and 354 may be combined into another bi-directional bus. The data width converter, e.g., 348 or 350, receives a first fixed or variable data width and converts the data width to a second fixed or variable data width. The data width conversion circuitry used has been explained earlier with reference to FIGS. 2-1 and 2-2.

Module 340 has an input port IN 342 and an output port OUT 344. For illustration purposes, let module 340 be an embedded microprocessor such as in Virtex II Pro™ FPGA from Xilinx Corp. of San Jose, CA. Bus 346 of width M3 may be an input data bus into IN 342, and bus 348 of width M4 may be an output address bus from OUT 344 of the microprocessor. Module 360 in this example is part of the FPGA's programmable logic fabric, which may include a block random access memory (BRAM). Module 360 has output port OUT 362 and input port IN 364, which may represent the address (IN 364) to the BRAM and the data (OUT 362) retrieved from the address. IN 364 receives the address from bus 354 of width N4 and OUT 362 sends data to bus 352 of width N3. N3, N4, M3, and M4 are positive integers.

Data width converter 350 receives the address on bus 348 of width M4 and converts it to an address on bus 354 of width N4. The address, in this example, on bus 348 is typically a fixed data width, although in cases of other types of modules, bus 348 can be of a fixed or variable data width. The address on bus 354 is of a fixed or variable data width. Module 360 receives the address and retrieves the data at the address from BRAM. The data is then put on bus 352 of fixed or variable width N3 and then converted to typically a fixed width M3 on bus 346 by data converter 348 in order to be used by the microprocessor in module 340. Again bus 346 may be fixed or variable for other types of modules 340.

In a programmable FPGA environment, the clock waveforms defined in FIGS. 3A–3D may be generated without additional external components using a single digital clock manager DCM (FIG. 1) located on PLD 100. Each DCM is similar in functionality to a phase-locked loop (PLL).

Transmit Interface

Figure 4:
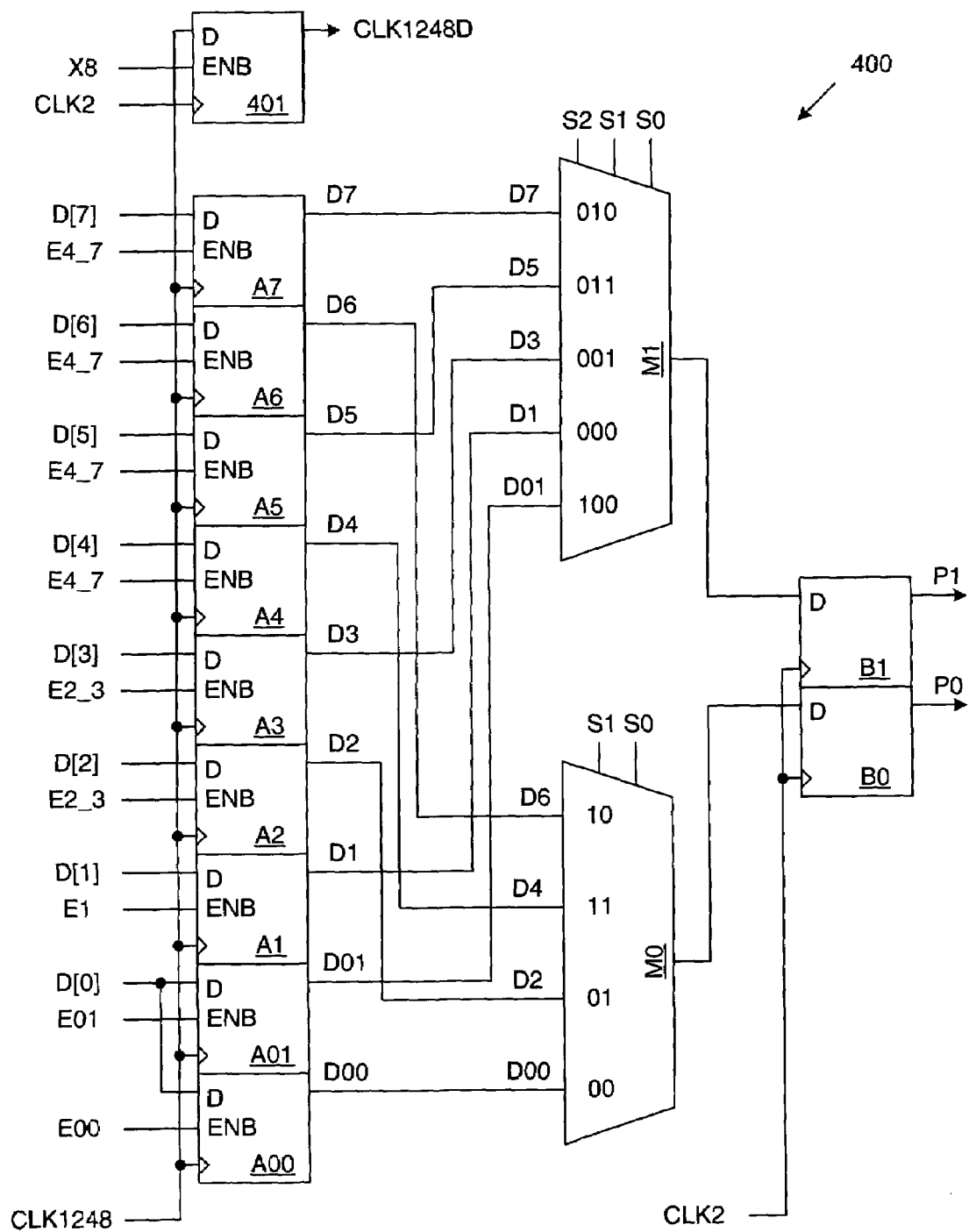
FIG. 4 is a circuit diagram of a transmit variable-width interface in accordance with one embodiment of the present invention.

FIG. 4 is a circuit diagram of a transmit variable-width interface 400 in accordance with one embodiment of the present invention. This interface 400 roughly corresponds with transmit variable-width interface 241 illustrated in FIG. 2-1. Transmit variable-width interface 400 includes flip-flops A00–A7, multiplexers M0–M1, flip-flops B0–B1 and half-cycle delay 401. Flip-flops A00–A01 receive input data signal D[0], and flip-flops A7–A1 receive input data signals D[7:1], respectively, from a data path corresponding to variable-width data path 251. Flip-flops A00–A7 are clocked by the CLK1248 signal, and provide output data signals D00–D7, respectively. Multiplexer M0 receives data values D00, D2, D4 and D6 on the "00", "01", "11" and "10" input terminals, respectively. Multiplexer M0 is controlled by control signals S1 and S0. Multiplexer M1 receives data values D01, D1, D3, D5 and D7 on the "100", "000", "001", "011" and "010" input terminals, respectively. Multiplexer M1 is controlled by control signals S2, S1 and S0. Multiplexers M0 and M1 route data signals to flip-flops B0 and B1, respectively. Flip-flops B0 and B1 are clocked in response to the CLK2 signal, and provide the output signals P0 and P1, respectively.

Figure 5:
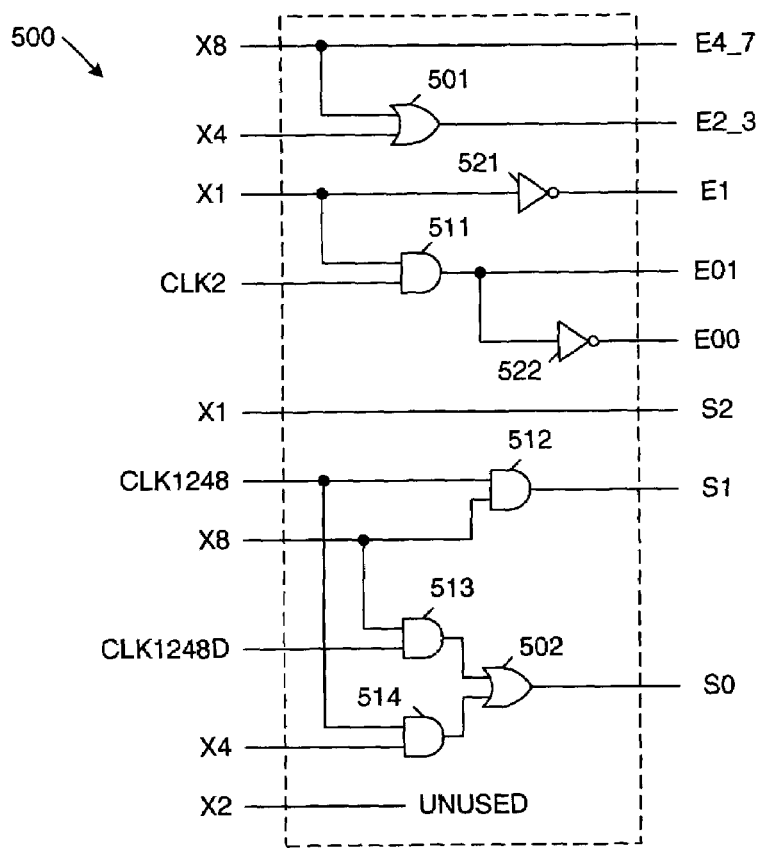
FIG. 5 is a circuit diagram of a transmit width control circuit used to control the transmit variable-width interface of FIG. 4, in accordance with one embodiment of the present invention.

FIG. 5 is a circuit diagram of a transmit width control circuit 500 used to control transmit variable-width interface 400 of FIG. 4. Transmit width control circuit 500 generates the control signals required to operate transmit variable-width interface 400. Transmit width control circuit 500 includes OR gates 501–502, AND gates 511–514 and inverters 521–522, which are configured as illustrated to generate the enable signals E4_7, E2_3, E1, E01, and E00 and the select signals S2, S1 and S0.

The data inputs to the transmit variable-width interface 400 include D[7:0] (for the 8-bit data path), D[3:0] (for the 4-bit data path), D[1:0] (for the 2-bit data path), and D[0] (for the 1-bit data path). The clock inputs to transmit variable-width interface 400 include the CLK1248 clock signal (for the input variable-width data path), and the CLK2 signal (for the output 2-bit data path). The control inputs to interface 400 include width control signals X1, X2, X4, and X8 (for variable data-width selection). One and only one of width control signals X1, X2, X4 or X8 is set to a logic high ("1") value, thereby identifying the selected data path width as 1-bit, 2-bits, 4-bits or 8-bits, respectively. Although the X2 control signal is not directly used in the described example, it is understood that this control signal X2 can be used in other variations. Transmit variable-width interface 400 provides a 2-bit output signal P[1:0].

Transmit variable-width interface 400 and control circuit 500 operate as follows. First, the user determines the desired width of the data path into interface 400. The values of the width control signals X1, X2, X4 and X8; the CLK1248 signal; and the input data values are then determined by this desired width. Table 1 below summarizes the values of the width control signals, the CLK1248 signal, and the input data values for the selected widths of 1-bit, 2-bits, 4-bits and 8-bits.

TABLE 1

Figure 3A:
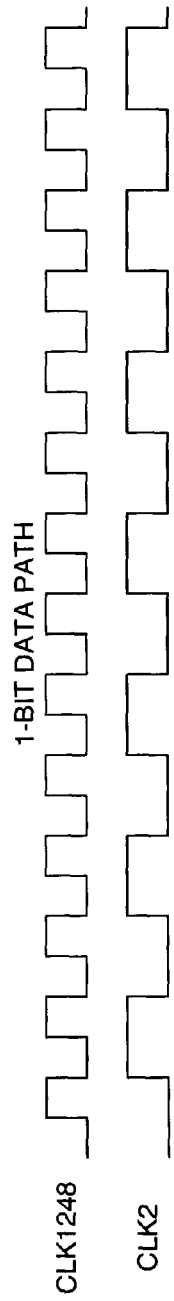
FIGS. 3A, 3B, 3C and 3D show the clock waveforms (CLK1248) used to control variable-width 1-bit, 2-bit, 4-bit and 8-bit data paths, respectively, as well as the clock waveform (CLK2) used to control fixed-width 2-bit data paths in accordance with one embodiment of the present invention.
Figure 3B:
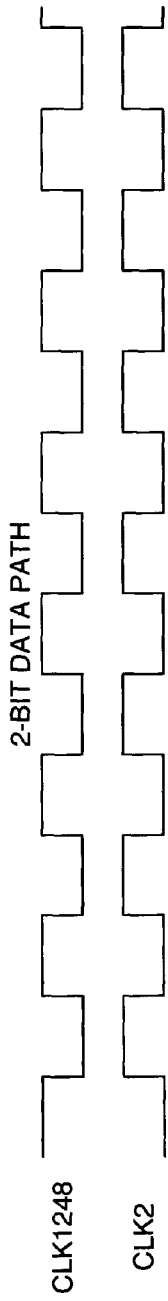
Figure 3C:
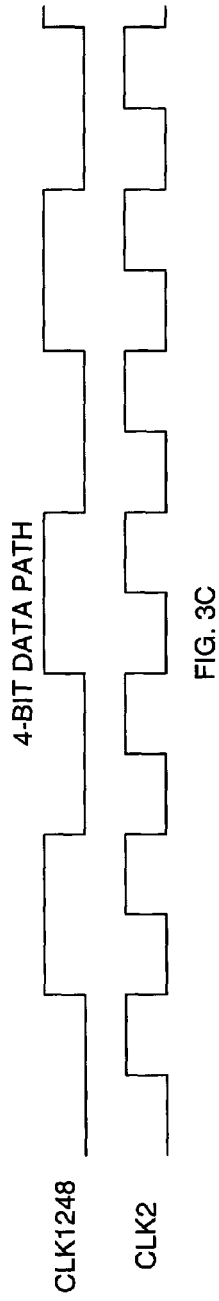
Figure 3D:
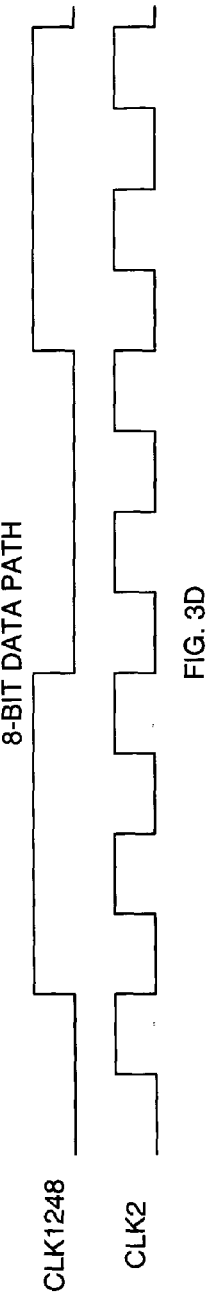

| Width | X8 | X4 | X2 | X1 | CLK1248 | Data |
|---|---|---|---|---|---|---|
| 1-bit | 0 | 0 | 0 | 1 | FIG. 3A | D[0] |
| 2-bits | 0 | 0 | 1 | 0 | FIG. 3B | D[1:0] |
| 4-bits | 0 | 1 | 0 | 0 | FIG. 3C | D[3:0] |
| 8-bits | 1 | 0 | 0 | 0 | FIG. 3D | D[7:0] |

Figure 6:
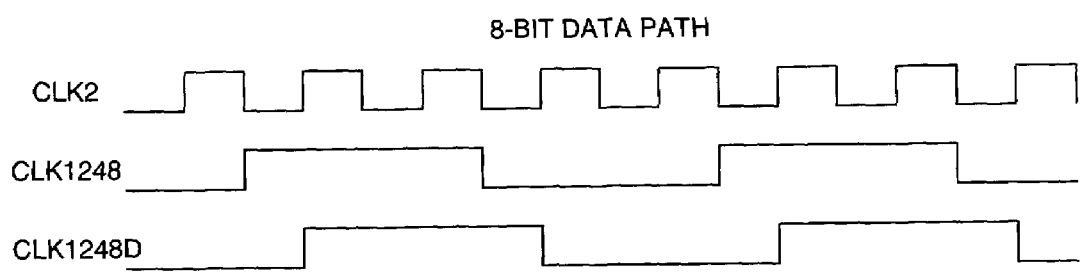
FIG. 6 is a waveform diagram illustrating the relationship between the CLK2 signal, the CLK1248 signal and a delayed CLK1248 signal (CLK1248D), which is enabled when an 8-bit variable-width data path is selected in accordance with one embodiment of the present invention.

The CLK1248D clock signal is generated as follows. Half cycle delay flip-flop 401 includes a clock terminal coupled to receive the CLK2 signal, a data input terminal coupled to receive the CLK1248 signal, and an enable terminal coupled to receive the X8 width control signal. If the X8 width control signal has a logic "0" value (i.e., during 1-bit, 2-bit and 4-bit operation), then the CLK1248D signal is held at a reset value of "0". However, if the X8 width control signal has a logic "1" value, then flip-flop 401 is enabled. In this case, delay flip-flop 401 causes the CLK1248D signal to lag the CLK1248 signal by one half cycle of the CLK2 signal. FIG. 6 is a waveform diagram illustrating the relationship between the CLK2, CLK1248 and CLK1248D signals when the X8 width control signal has a logic "1" value.

The various widths of transmit variable-width interface 400 will now be described in detail.

1-Bit Data Path

When transmit variable-width interface 400 is configured to have a 1-bit width, the X8, X4, X2, X1 signals have values of (0,0,0,1) as illustrated in Table 1. In this case, transmit width control circuit 500 generates enable signals E4_7, E2_3, E1, E01 and E00, and select signals S2, S1 and S0 as illustrated in Table 2. Note that the symbol "#" identifies the inverse of a signal. Also note that the enable signals are labeled to identify the flip-flops A00–A7 (FIG. 4) that they enable. Thus, enable signal E4_7 enables flip-flops A4–A7, enable signal E2_3 enables flip-flops A2–A3, enable signal E1 enables flip-flop A1, enable signal E01 enables flip-flop A01, and enable signal E00 enables flip-flop A00.

TABLE 2

| E4_7 | E2_3 | E1 | E01 | E00 | S2 | S1 | S0 |
|---|---|---|---|---|---|---|---|
| 0 | 0 | 0 | CLK2 | CLK2# | 1 | 0 | 0 |

Turning to FIG. 4, these enable and select values have the following effect in transmit variable-width interface 400. The logic "0" enable signals E4_7, E2_3 and E1 disable flip-flops A1–A7. Enable signals E01 and E00 alternately enable flip-flops A00 and A01 during alternate half-cycles of the CLK2 signal. Each time that flip-flop A01 is enabled, a rising edge of the CLK1248 signal causes the applied 1-bit data value D[0] to be latched into flip-flop A01, and provided as data signal D01. The data signal D01 is applied to the "100" input terminal of multiplexer M1. Data signal D01 is routed through multiplexer M1 to flip-flop B1 in response to select signals S2, S1, S0, which have a value of (1,0,0).

Similarly, each time that flip-flop A00 is enabled, a rising edge of the CLK1248 signal causes the applied 1-bit data value D[0] to be latched into flip-flop A00, and provided as output signal D00. Data signal D00 is applied to the "00" input terminal of multiplexer M0. Data signal D00 is routed through multiplexer M0 to flip-flop B0 in response to select signals S1 and S0, which have a value of (0,0).

Figure 7A:
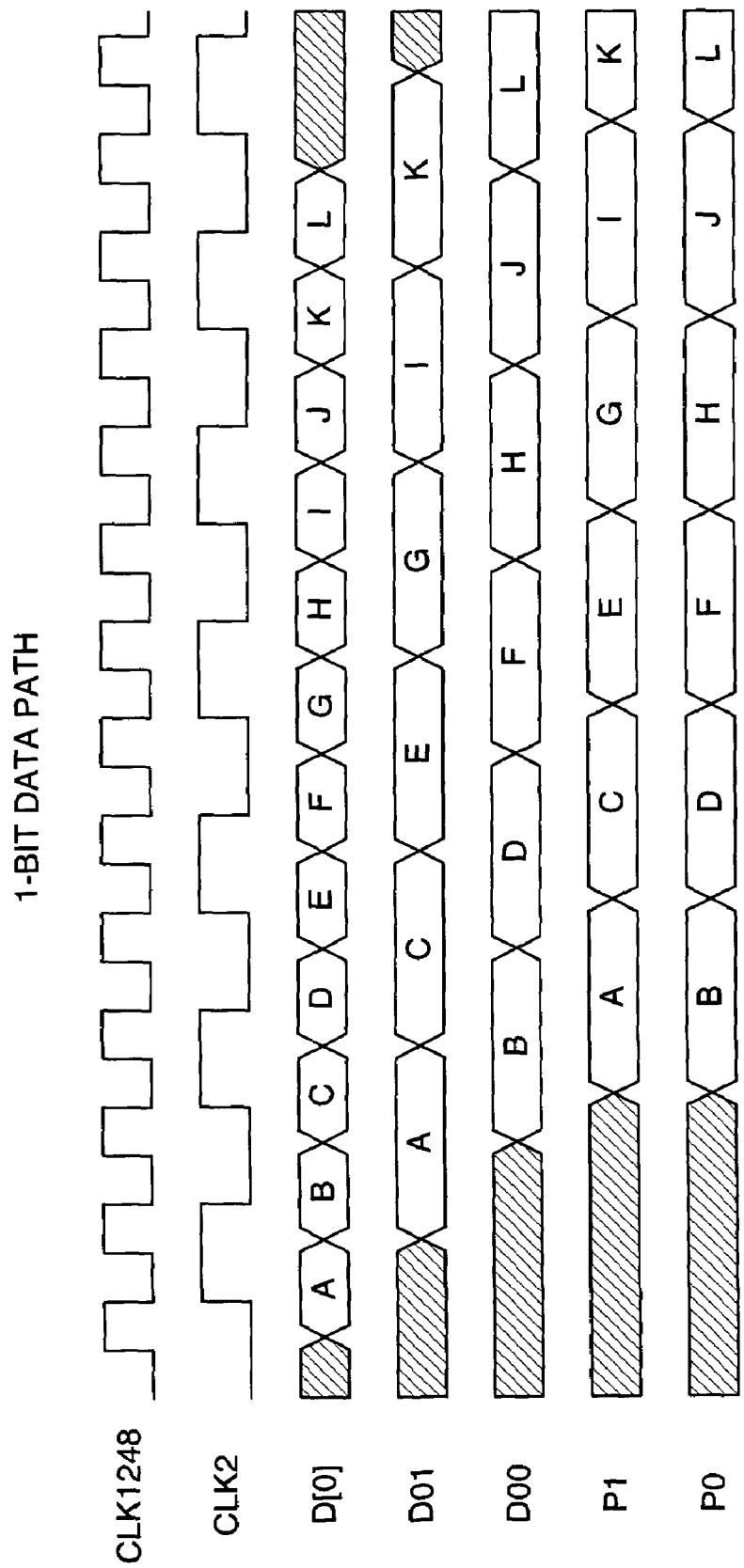
FIGS. 7A, 7B, 7C, and 7D are waveform diagrams illustrating the timing of the transmit variable-width interface of FIG. 4 for 1-bit, 2-bit, 4-bit and 8-bit data paths, respectively, in accordance with one embodiment of the present invention.

Flip-flops B0 and B1 are clocked in response to the rising edges of the CLK2 signal, thereby providing the data signals D00 and D01 as output signals P0 and P1, respectively. The timing of transmit variable-width interface 400 for a 1-bit data path is illustrated in FIG. 7A. Note that the offset between the rising edges of the CLK1248 and the CLK2 signals (which is equal to half the period of the CLK1248 clock signal) allows the interface 400 to exhibit adequate set-up and hold times even if the CLK1248 and CLK2 signals exhibit small amounts of skew.

2-Bit Data Path

When transmit variable-width interface 400 is configured to have a 2-bit width, the X8, X4, X2, X1 signals have values of (0,0,1,0) as illustrated in Table 1. In this case, width control circuit 500 generates enable signals E4_7, E2_3, E1, E01 and E00, and select signals S2, S1 and S0 as illustrated in Table 3.

TABLE 3

| E4_7 | E2_3 | E1 | E01 | E00 | S2 | S1 | S0 |
|---|---|---|---|---|---|---|---|
| 0 | 0 | 1 | 0 | 1 | 0 | 0 | 0 |

Turning to FIG. 4, these enable and select values have the following effect in transmit variable-width interface 400. The logic "0" enable signals E4_7, E2_3, and E01 disable flip-flops A01 and A2–A7. Enable signals E1 and E00 enable flip-flops A1 and A00, respectively. Each rising edge of the CLK1248 signal causes the bits D[1] and D[0] of the applied 2-bit data value D[1:0] to be latched into flip-flops A1 and A00, and provided as data signals D1 and D00, respectively. The data signal D1 is applied to the "000" input terminal of multiplexer M1. Data signal D1 is routed through multiplexer M1 to flip-flop B1 in response to select signals S2, S1, S0, which have a value of (0,0,0).

Similarly, data signal D00 is applied to the "00" input terminal of multiplexer M0. Data signal D00 is routed through multiplexer M0 to flip-flop B0 in response to select signals S1 and S0, which have a value of (0,0).

Figure 7B:
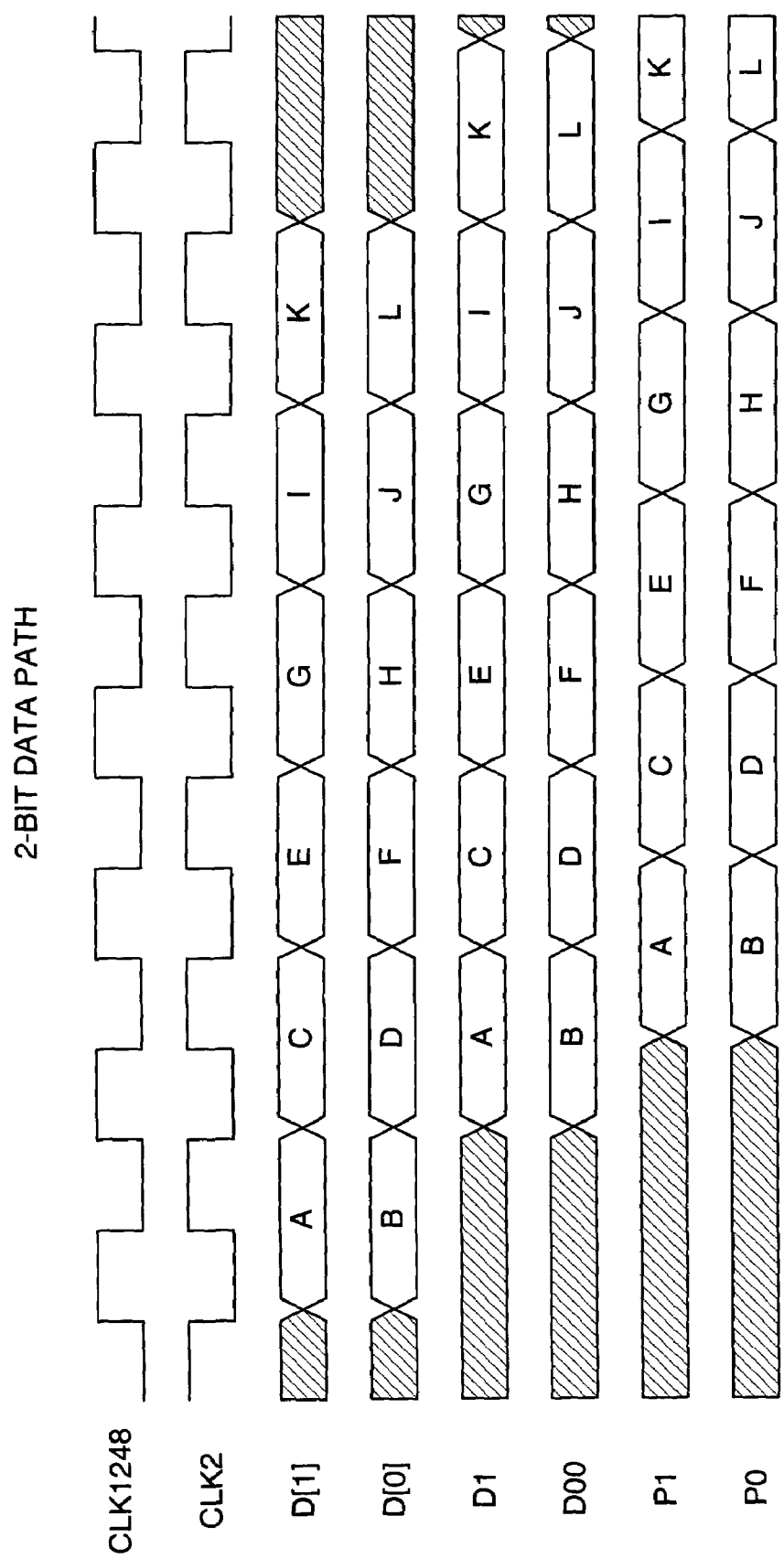

Flip-flops B0 and B1 are clocked in response to the rising edges of the CLK2 signal, thereby providing the data signals D1 and D00 as output signals P0 and P1, respectively. The timing of transmit variable-width interface 400 for a 2-bit data path is illustrated in FIG. 7B. Note that the offset between the rising edges of the CLK1248 and the CLK2 signals (which is equal to half the period of the CLK1248 clock signal) allows the interface 400 to exhibit adequate set-up and hold times even if the CLK1248 and CLK2 signals exhibit small amounts of skew.

4-Bit Data Path

When transmit variable-width interface 400 is configured to have a 4-bit width, the X8, X4, X2, X1 signals have values of (0,1,0,0) as illustrated in Table 1. In this case, width control circuit 500 generates enable signals E4_7, E2_3, E1, E01 and E00, and select signals S2, S1 and S0 as illustrated in Table 4.

TABLE 4

| E4_7 | E2_3 | E1 | E01 | E00 | S2 | S1 | S0 |
|------|------|----|-----|-----|----|----|----|
| 0 | 1 | 1 | 0 | 1 | 0 | 0 | CLK1248 |

Turning to FIG. 4, these enable and select values have the following effect in transmit variable-width interface 400. The logic "0" enable signals E4_7 and E01 disable flip-flops A01 and A4–A7. Enable signals E2_3, E1 and E00 enable flip-flops A3, A2, A1 and A00. Each rising edge of the CLK1248 signal causes the bits D[3], D[2], D[1] and D[0] of the applied 4-bit data value D[3:0] to be latched into flip-flops A3, A2, A1, and A00, and provided as data signals D3, D2, D1 and D00, respectively. The data signals D3 and D1 are applied to the "001" and "000" input terminals of multiplexer M1. The data signals D2 and D00 are applied to the "01" and "00" input terminals of multiplexer M0.

When the CLK1248 signal has a value of "1", data signals D3 and D2 are routed through multiplexers M1 and M0, respectively, to flip-flops B1 and B0, respectively, in response to select signals S2, S1, S0, which have a value of (0,0,1).

When the CLK1248 signal has a value of "0", data signals D1 and D00 are routed through multiplexers M1 and M0, respectively, to flip-flops B1 and B0, respectively, in response to select signals S2, S1, S0, which have a value of (0,0,0).

Figure 7C:
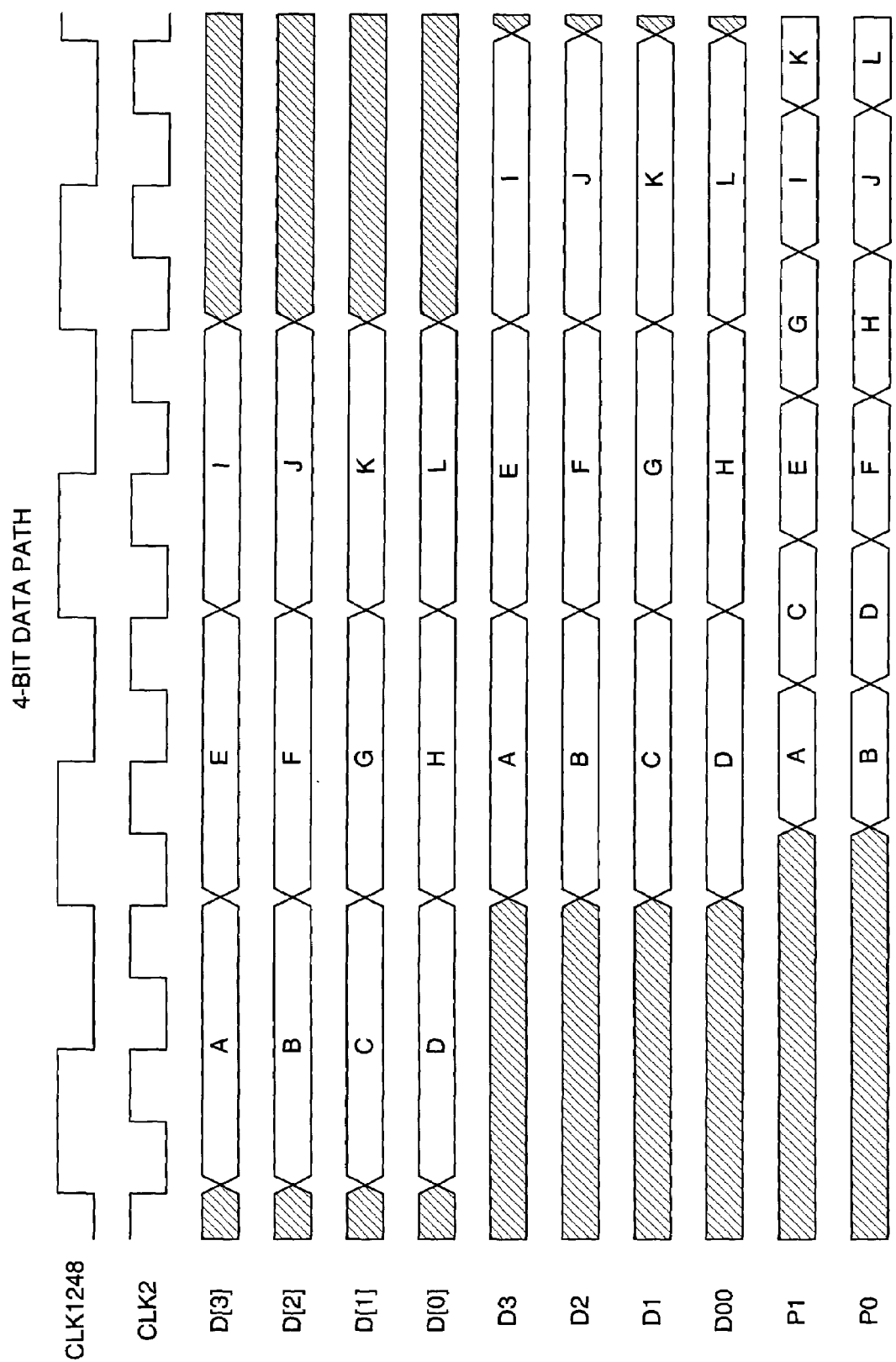

Flip-flops B0 and B1 are clocked in response to the rising edges of the CLK2 signal, thereby providing the data signals D3 and D2 as output signals P0 and P1, respectively, in response to a rising edge of the CLK2 signal, and providing the data signals D1 and D00 as output signals P0 and P1, respectively, in response to the next rising edge of the CLK2 signal. The timing of transmit variable-width interface 400 for a 4-bit data path is illustrated in FIG. 7C. Note that the offset between the rising edges of the CLK1248 and the CLK2 signals (which is equal to one quarter of the period of the CLK1248 clock signal) allows the interface 400 to exhibit adequate set-up and hold times even if the CLK1248 and CLK2 signals exhibit small amounts of skew.

8-Bit Data Path

When transmit variable-width interface 400 is configured to have an 8-bit width, the X8, X4, X2, X1 signals have values of (1,0,0,0) as illustrated in Table 1. In this case, width control circuit 500 generates enable signals E4_7, E2_3, E1, E01 and E00, and select signals S2, S1 and S0 as illustrated in Table 5.

TABLE 5

| E4_7 | E2_3 | E1 | E01 | E00 | S2 | S1 | S0 |
|------|------|----|-----|-----|----|----|----|
| 1 | 1 | 1 | 0 | 1 | 0 | CLK1248 | CLK1248D |

Turning to FIG. 4, these enable and select values have the following effect in transmit variable-width interface 400. The logic "0" enable signal E01 disables flip-flop A01. The logic "1" enable signals E4_7, E2_3, E1 and E00 enable flip-flops A1–A7 and A00. Each rising edge of the CLK1248 signal causes the bits D[7], D[6], D[5], D[4], D[3], D[2], D[1] and D[0] of the applied 8-bit data value D[7:0] to be latched into flip-flops A7, A6, A5, A4, A3, A2, A1, and A00, and provided as data signals D7, D6, D5, D4, D3, D2, D1 and D00, respectively. The data signals D7, D5, D3 and D1 are applied to the "010", "011", "001" and "000" input terminals of multiplexer M1, respectively. The data signals D6, D4, D2 and D00 are applied to the "10", "11", "01" and "00" input terminals of multiplexer M0, respectively.

Figure 7D:
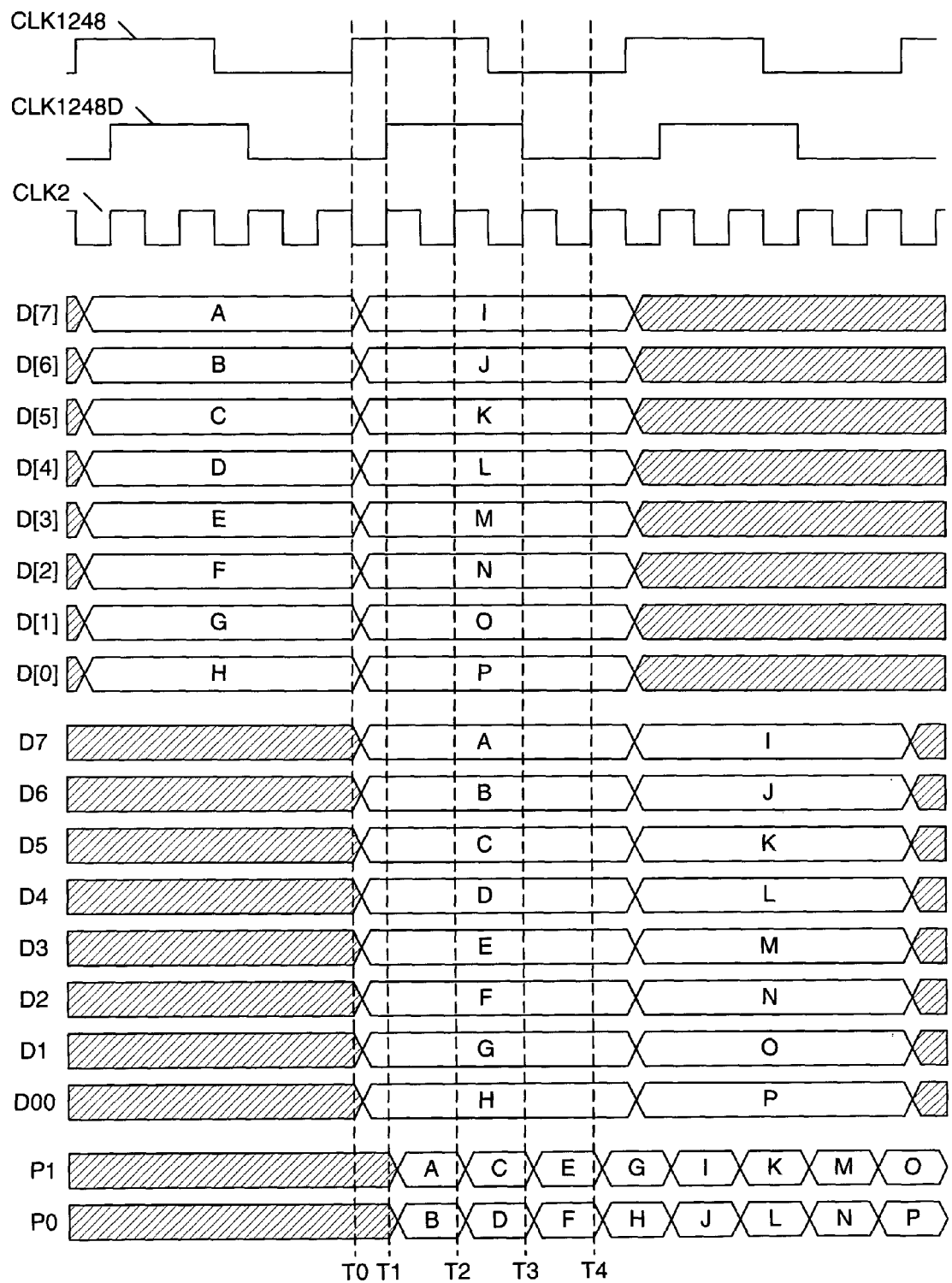

The timing of transmit variable-width interface 400 for an 8-bit data path is illustrated in FIG. 7D. At time T0, the rising edge of the CLK1248 signal causes the data values D[7:0] (i.e., A–H) to be latched into flip-flops A7–A1 and A00 as data signals D7–D1 and D00. Prior to time T1, the CLK1248 signal has a logic "1" value and the CLK1248D signal has a logic "0" value. As a result, the S2, S1, S0 signals have a value of (0,1,0), thereby routing data signal D7 (i.e., A) and data signal D6 (i.e., B) through multiplexers M1 and M0, respectively, to flip-flops B1 and B0, respectively. At time T1, the rising edge of the CLK2 signal causes these data signals A and B to be latched into flip-flops B1 and B0, respectively, and provided as output signals P1 and P0.

Just prior to time T2, the CLK1248 signal has a logic "1" value and the CLK1248D signal has a logic "1" value. As a result, the S2, S1, S0 signals have a value of (0,1,1), thereby routing data signal D5 (i.e., C) and data signal D4 (i.e., D) through multiplexers M1 and M0, respectively, to flip-flops B1 and B0, respectively. At time T2, the rising edge of the CLK2 signal causes these data signals C and D to be latched into flip-flops B1 and B0, respectively, and provided as output signals P1 and P0.

Just prior to time T3, the CLK1248 signal has a logic "0" value and the CLK1248D signal has a logic "1" value. As a result, the S2, S1, S0 signals have a value of (0,0,1), thereby routing data signal D3 (i.e., E) and data signal D2 (i.e., F) through multiplexers M1 and M0, respectively, to flip-flops B1 and B0, respectively. At time T3, the rising edge of the CLK2 signal causes these data signals E and F to be latched into flip-flops B1 and B0, respectively, and provided as output signals P1 and P0.

Just prior to time T4, the CLK1248 signal has a logic "0" value and the CLK1248D signal has a logic "0" value. As a result, the S2, S1, S0 signals have a value of (0,0,0), thereby routing data signal D1 (i.e., G) and data signal D00 (i.e., H) through multiplexers M1 and M0, respectively, to flip-flops B1 and B0, respectively. At time T4, the rising edge of the CLK2 signal causes these data signals G and H to be latched into flip-flops B1 and B0, respectively, and provided as output signals P1 and P0.

This process is repeated for the next 8-bit data value (i.e., data signals I-P), as illustrated. Note that the offset between the rising edges of the CLK1248 and the CLK2 signals (which is equal to one eighth of the period of the CLK1248 clock signal) allows transmit variable-width interface 400 to exhibit adequate set-up and hold times even if the CLK1248 and CLK2 signals exhibit small amounts of skew.

In the foregoing manner, transmit variable-width interface 400 supports variable data widths of 1-bit, 2-bits, 4-bits and 8-bits in core block 150, and a fixed data width of 2-bits in MGT 110.

Receive Interface

Figure 8:
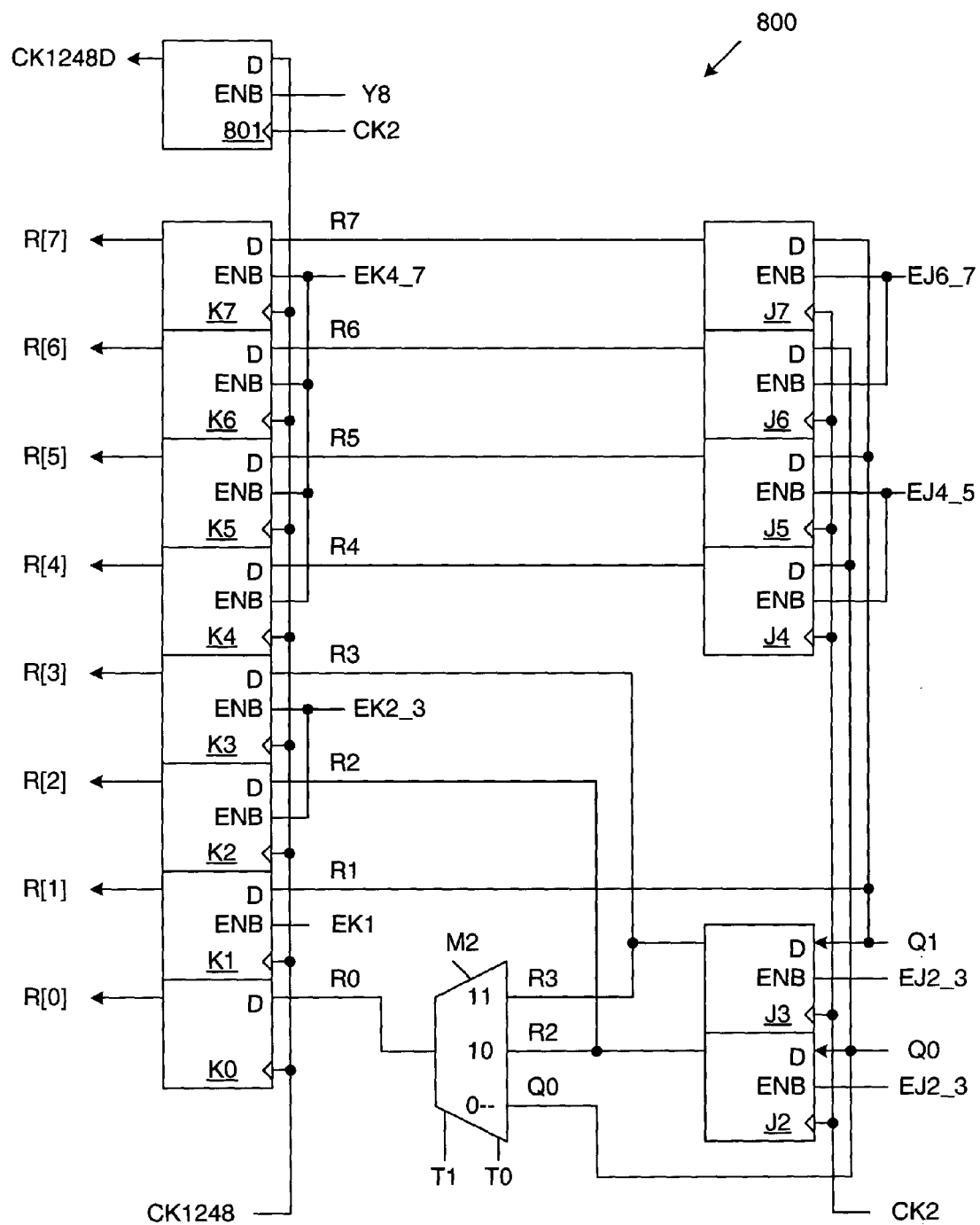
FIG. 8 is a circuit diagram of a receive variable-width interface in accordance with one embodiment of the present invention.

FIG. 8 is a circuit diagram of a receive variable-width interface 800 in accordance with one embodiment of the present invention. This interface 800 roughly corresponds with receive variable-width interface 242 illustrated in FIG. 2-1. Receive variable-width interface operates in response to clock signals CK2 and CK1248. These clock signals CK2 and CK1248 are different signals than the clock signals CLK2 and CLK1248 described above. However, for purposes of the present description, clock signals CK2 and CK1248 have the same phase relationships as clock signals CLK2 and CLK1248, respectively, illustrated in FIGS. 3A–3D.

Receive variable-width interface 800 includes flip-flops J2–J7, multiplexer M2, flip-flops K0–K7 and half-cycle delay 801. Flip-flops J2, J4 and J6 receive input data signal Q[0], and flip-flops J3, J5 and J7 receive input data signal Q[1], from a data path corresponding to fixed width data path 232 (FIG. 2-1). Flip-flops J2–J7 are clocked by the CK2 signal, and provide output data signals R2–R7, respectively. Multiplexer M2 receives data signals Q0, R2 and R3 on the "0-", "10" and "11", input terminals, respectively. Multiplexer M2 is controlled by control signals T1 and T0. Multiplexer M2 routes a data signal R0 to flip-flop KO. Data signals R1–R7 are provided to flip-flops K1–K7, respectively. Flip-flops K7–K0 are clocked in response to the CK1248 signal, and provide the output signals R[7:0], respectively.

Figure 9:
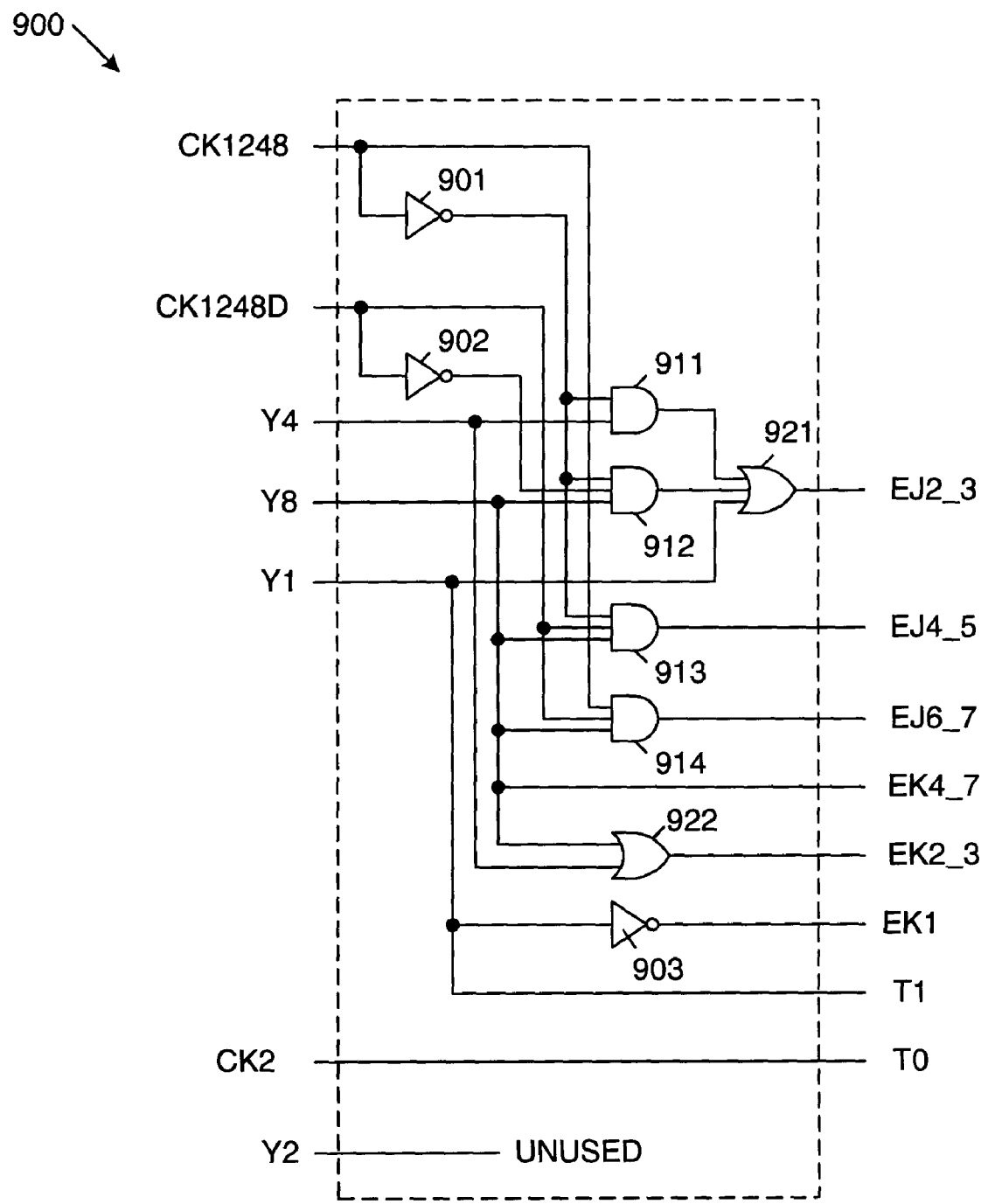
FIG. 9 is a circuit diagram of a receive width control circuit used to control the receive variable-width interface of FIG. 8, in accordance with one embodiment of the present invention.

FIG. 9 is a receive width control circuit 900 used to control receive variable-width interface 800 of FIG. 8. Receive width control circuit 900 generates the control signals required to operate receive variable-width interface 800. Receive width control circuit 900 includes inverters 901–903, AND gates 911–914, and OR gates 921–922, which are configured as illustrated.

A 2-bit input data signal Q[1:0] is provided to interface 800. The data outputs of the variable-width data path include R[7:0] (for the 8-bit data path), R[3:0] (for the 4-bit data path), R[1:0] (for the 2-bit data path), and R[0] (for the 1-bit data path). The clock inputs to receive variable-width interface 800 include the CK1248 clock signal (for the output variable-width data path), and the CK2 signal (for the input 2-bit data path). The control inputs to interface 800 include width control signals Y1, Y2, Y4, and Y8 (for variable data-width selection). One and only one of width control signals Y1, Y2, Y4 or Y8 is set to a logic high ("1") value, thereby identifying the selected data path width as 1-bit, 2-bits, 4-bits or 8-bits, respectively.

Receive variable-width interface 800 and receive width control circuit 900 operate as follows. First, the user determines the desired width of the data path out of interface 800. The values of the width control signals Y1, Y2, Y4 and Y8, the CK1248 signal, and the input data values are then determined by this desired width. Table 6 below summarizes the values of the width control signals, the CK1248 signal, and the output data values for the selected widths of 1-bit, 2-bits, 4-bits and 8-bits.

TABLE 6

| Width | Y8 | Y4 | Y2 | Y1 | CK1248 | Data |
|---|---|---|---|---|---|---|
| 1-bit | 0 | 0 | 0 | 1 | FIG. 3A | R[0] |
| 2-bits | 0 | 0 | 1 | 0 | FIG. 3B | R[1:0] |
| 4-bits | 0 | 1 | 0 | 0 | FIG. 3C | R[3:0] |
| 8-bits | 1 | 0 | 0 | 0 | FIG. 3D | R[7:0] |

Half cycle delay flip-flop 801 generates the CK1248D clock signal in the same manner as flip-flop 401 (See, FIG. 6). The various widths of receive variable-width interface 800 will now be described in detail.

1-Bit Data Path

When receive variable-width interface 800 is configured to have a 1-bit output width, the Y8, Y4, Y2, Y1 signals have values of (0,0,0,1) as illustrated in Table 6. In this case, width control circuit 900 generates enable signals EJ6_7, EJ4_5, EJ2_3, EK4_7, EK2_3 and EK1, and select signals T1 and T0 as illustrated in Table 7. The enable signals are labeled to identify the flip-flops J2–J7 and K0–K7 (FIG. 8) that they enable. Thus, enable signal EJ6_7 enables flip-flops J6 and J7, enable signal EJ4_5 enables flip-flops J4 and J5, enable signal EJ2_3 enables flip-flops J2 and J3, enable signal EK1 enables flip-flop K1, enable signal EK2_3 enables flip-flops K2 and K3, and enable signal EK4_7 enables flip-flops K4–K7. Flip-flop K0 is always enabled.

TABLE 7

| EJ6_7 | EJ4_5 | EJ2_3 | EK4_7 | EK2_3 | EK1 | T1 | T0 |
|---|---|---|---|---|---|---|---|
| 0 | 0 | 1 | 0 | 0 | 0 | 1 | CK2 |

Figure 10A:
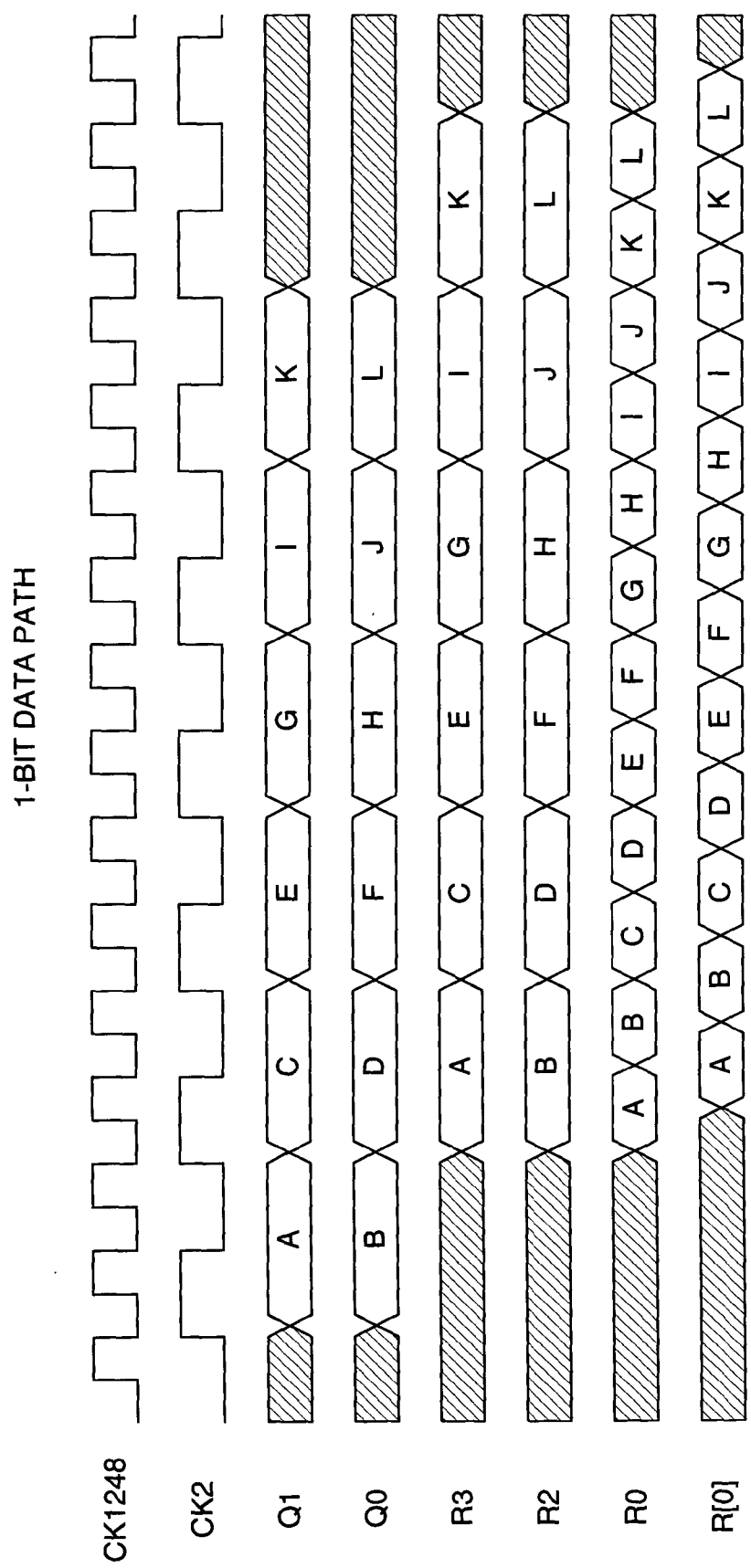
FIGS. 10A, 10B, 10C, and 10D are waveform diagrams illustrating the timing of the receive variable-width interface of FIG. 8 for 1-bit, 2-bit, 4-bit and 8-bit data paths, respectively, in accordance with one embodiment of the present invention.

Turning to FIG. 8, these enable and select values have the following effect in receive variable-width interface 800. The logic "0" enable signals EJ6_7, EJ4_5, EK4_7, EK2_3 and EK1 disable flip-flops J4–J7 and K1–K7. The logic "1" enable signal EJ2_3 enables flip-flops J2 and J3. The received data signals Q0 and Q1 are latched into flip-flops J2 and J3 as data signals R2 and R3, respectively, in response to rising edges of the CK2 signal. Flip-flops J2 and J3 then provide these data signals R2 and R3 to the "10" and "11" input terminals, respectively, of multiplexer M2. The control signals T1–T0 provided to multiplexer M2 transition between values of "11" and "10" in response to the rising and falling edges of the CK2 signal (see Table 7). Thus, multiplexer M2 will route the R3 data signal, and then the R2 data signal, to flip-flop K0 as the data signal R0. Flip-flop K0 latches the R0 data signal on rising edges of the CK1248 clock signal, thereby providing the 1-bit R[0] data signal. The timing of receive variable-width interface 800 for a 1-bit data path is illustrated in FIG. 10A. Note that the offset between the rising edges of the CK1248 and the CK2 signals (which is equal to half the period of the CK1248 clock signal) allows the interface 800 to exhibit adequate set-up and hold times even if the CK1248 and CK2 signals exhibit small amounts of skew.

2-Bit Data Path

When receive variable-width interface 800 is configured to have a 2-bit output width, the Y8, Y4, Y2, Y1 signals have values of (0,0,1,0) as illustrated in Table 6. In this case, width control circuit 900 generates enable signals EJ6_7, EJ4_5, EJ2_3, EK4_7, EK2_3, and EK1, and select signals T1 and T0 as illustrated in Table 8.

TABLE 8

| EJ6_7 | EJ4_5 | EJ2_3 | EK4_7 | EK2_3 | EK1 | T1 | T0 |
|---|---|---|---|---|---|---|---|
| 0 | 0 | 0 | 0 | 0 | 1 | 0 | CK2 |

Figure 10B:
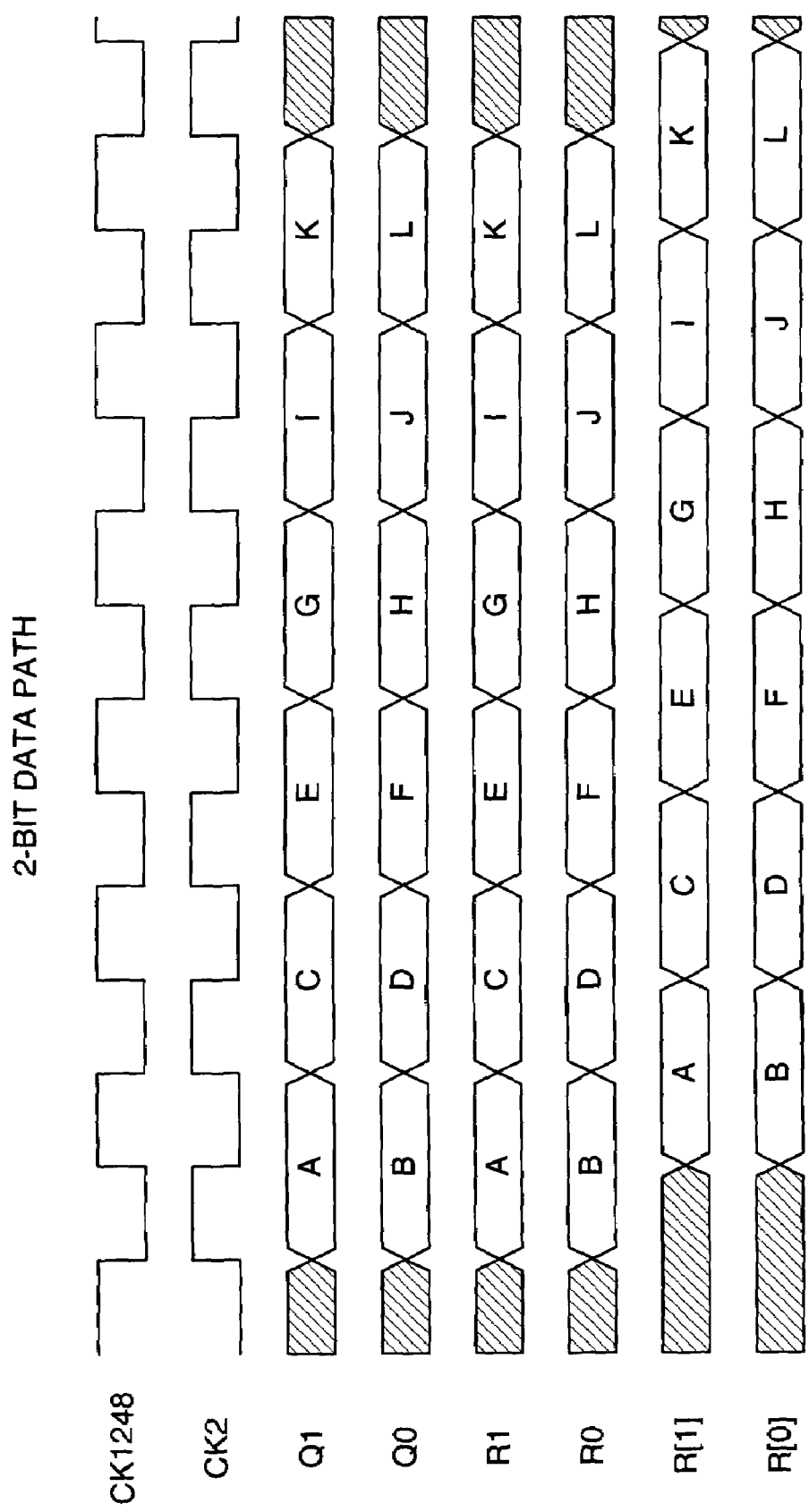

Turning to FIG. 8, these enable and select values have the following effect in receive variable-width interface 800. The logic "0" enable signals EJ6_7, EJ4_5, EJ2_3, EK4_7, and EK2_3 disable flip-flops J2–J7 and K2–K7. The logic "1" enable signal EK1 enables flip-flop K1. The received data signal Q1 is routed directly to flip-flop K1 as data signal R1, and the received data signal Q0 is routed to flip-flop K0 through multiplexer M2 as data signal R0. Note that the logic "0" value of the T1 select signal causes multiplexer M2 to route the Q0 signal, regardless of the state of the CK2 signal. That is, flip-flops J2–J3 are bypassed in the 2-bit data path. The R1 and R0 data signals are latched into flip-flops K1 and K0, respectively, in response to rising edges of the CK1248 clock signal, and provided as 2-bit output signal R[1:0]. The timing of interface 800 for a 2-bit data path is illustrated in FIG. 10B.

4-Bit Data Path

When receive variable-width interface 800 is configured to have a 4-bit output width, the Y8, Y4, Y2, Y1 signals have values of (0,1,0,0) as illustrated in Table 6. In this case, width control circuit 900 generates enable signals EJ6_7, EJ4_5, EJ2_3, EK4_7, EK2_3, and EK1, and select signals T1 and T0 as illustrated in Table 9.

TABLE 9

| EJ6_7 | EJ4_5 | EJ2_3 | EK4_7 | EK2_3 | EK1 | T1 | T0 |
|---|---|---|---|---|---|---|---|
| 0 | 0 | CK1248# | 0 | 1 | 1 | 0 | CK2 |

Figure 10C:
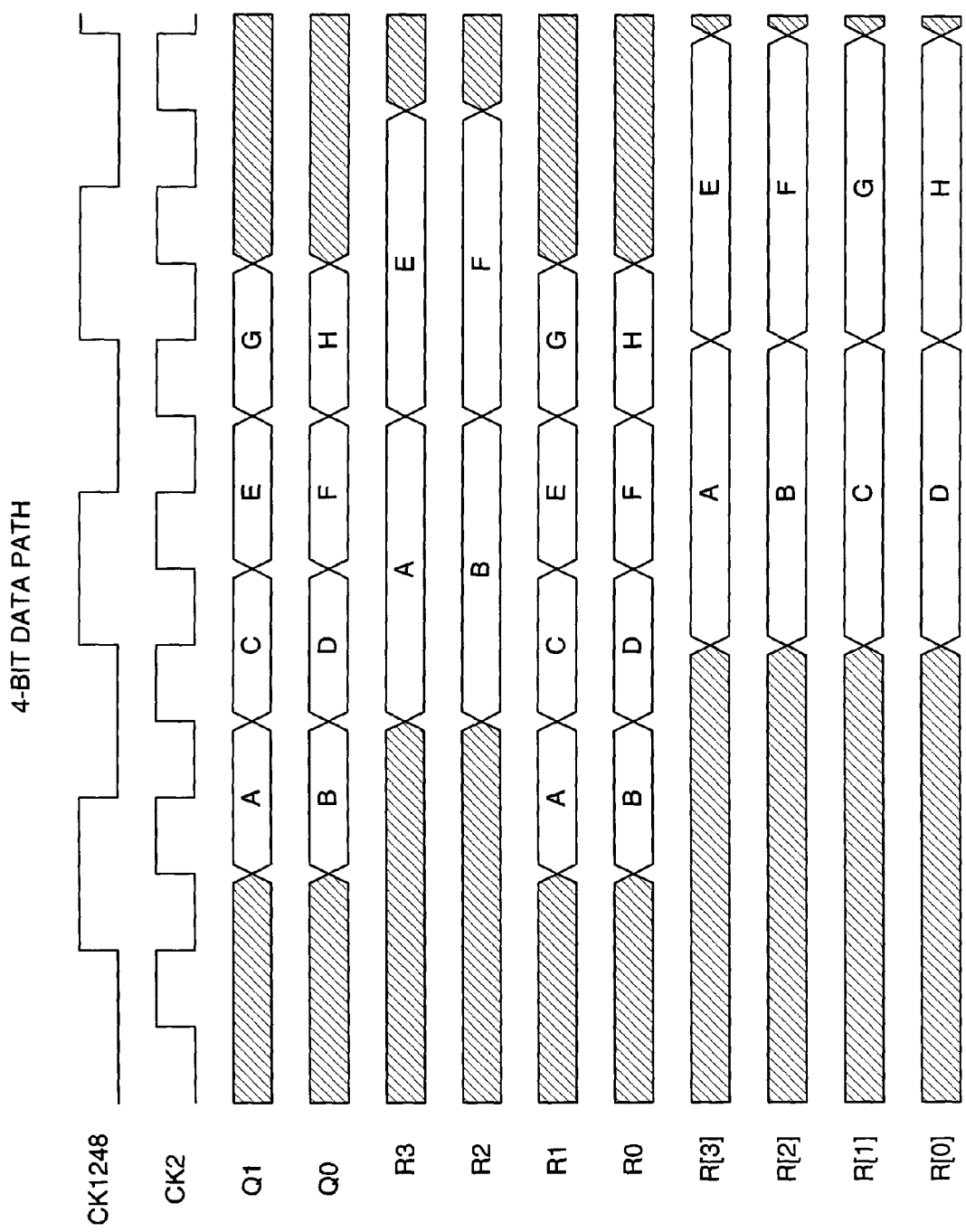

Turning to FIG. 8, these enable and select values have the following effect in receive variable-width interface 800. The logic "0" enable signals EJ6_7, EJ4_5 and EK4_7, disable flip-flops J4–J7 and K4–K7. The logic "1" enable signals EK1 and EK2_3 enable flip-flops K1–K3. The received data signals Q1 and Q0 are latched into flip-flops J3 and J2, respectively, as data signals R3 and R2, respectively, when the CK1248 signal has a logic low value (CK1248#="1") and the CK2 signal has a rising edge. On the same rising edge of the CK2 signal, the Q1 and Q0 data signals transition to represent two new data values. These two new data values propagate directly to flip-flops K1 and K0 as data signals R1 and R0 well before the next rising edge of the CK1248 signal. At the next rising edge of the CK1248 signal, the R3 and R2 data values in flip-flops J3 and J2 are latched into flip-flops K3 and K2, respectively, and the data values R1 and R0 are latched into flip-flops K1 and K0, respectively. These data values are provided at the output terminals of flip-flops K3–K0 as the output data signal R[3:0]. The timing of receive variable-width interface 800 for a 4-bit data path is illustrated in FIG. 10C.

8-Bit Data Path

When receive variable-width interface 800 is configured to have a 8-bit output width, the Y8, Y4, Y2, Y1 signals have values of (1,0,0,0) as illustrated in Table 6. In this case, width control circuit 900 generates enable signals EJ6_7, EJ4_5, EJ2_3, EK4_7, EK2_3, and EK1, and select signals T1 and T0 as illustrated in Table 10.

TABLE 10

| EJ6_7 | EJ4_5 | EJ2_3 | EK4_7 | EK2_3 | EK1 | T1 | T0 |
|---|---|---|---|---|---|---|---|
| CLK_A | CLK_B | CLK_C | 1 | 1 | 1 | 0 | CK2 |

Figure 10D:
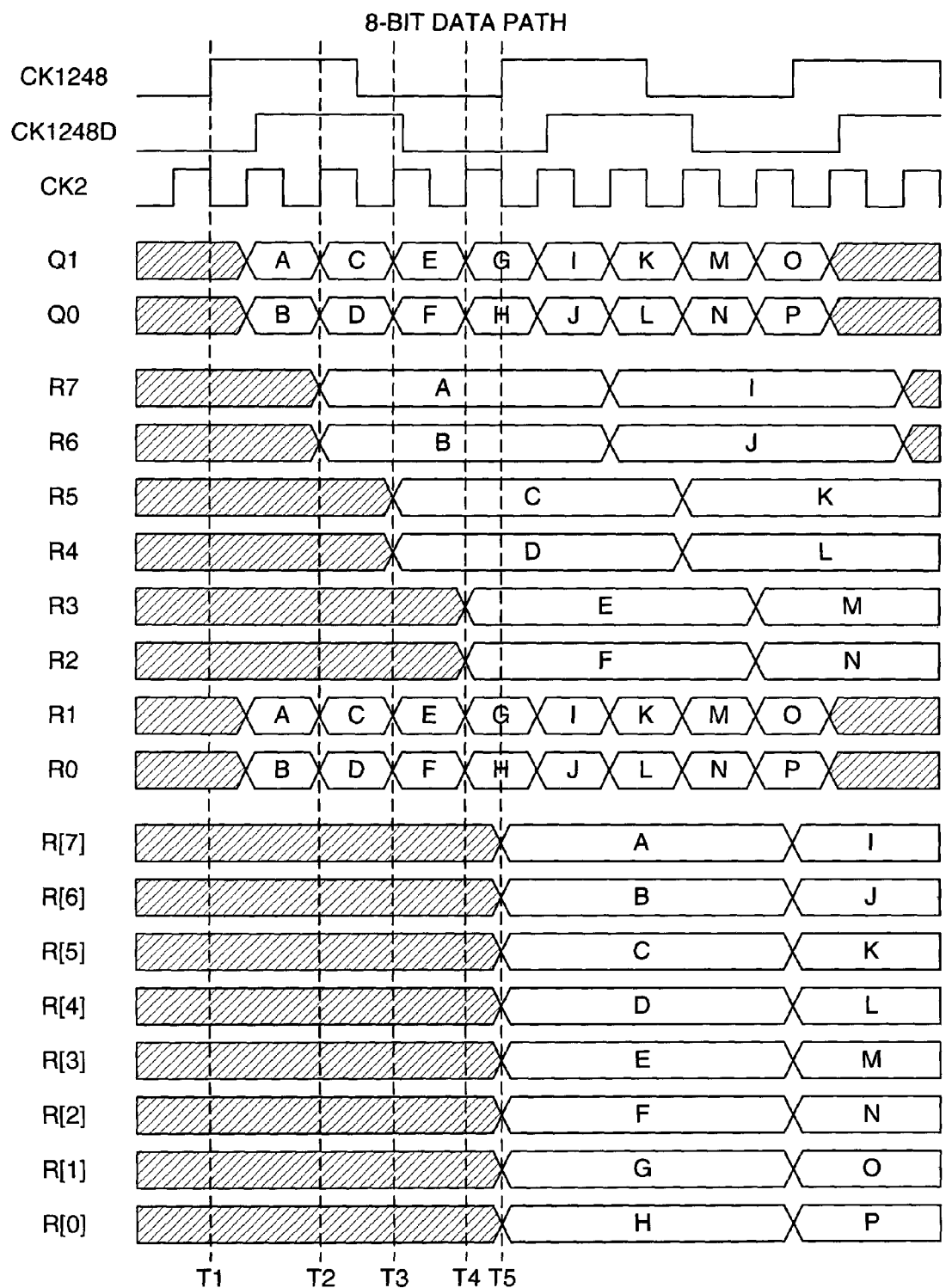
Figure 11:
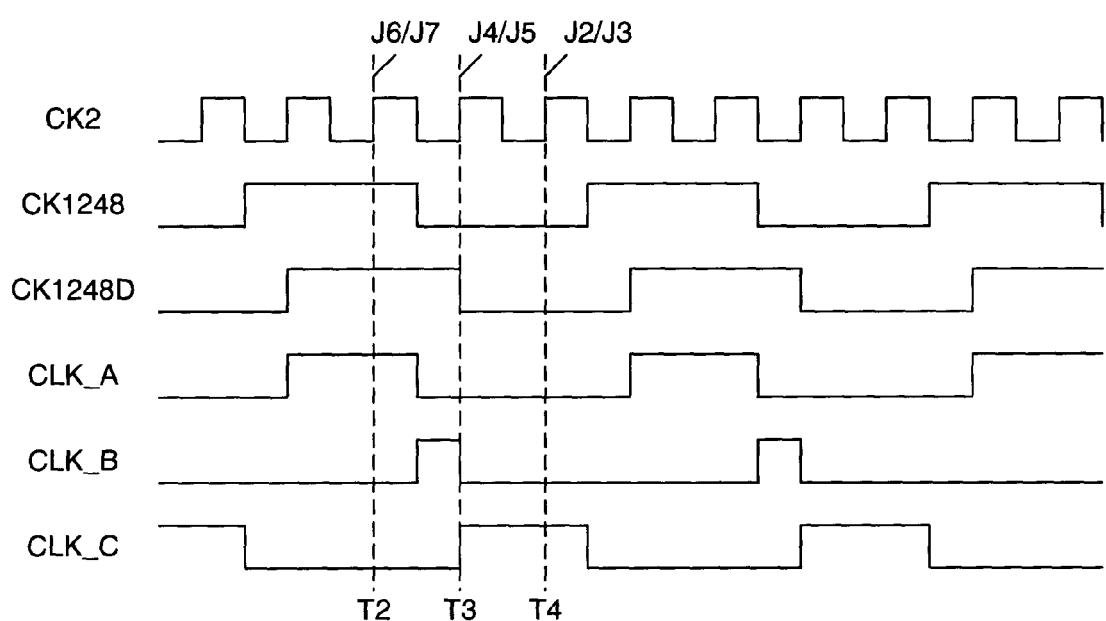
FIG. 11 is a waveform diagram of three clock signals (CLK_A, CLK_B and CLK_C) used to control the 8-bit wide data path of the receive variable-width interface of FIG. 8 in accordance with one embodiment of the present invention.

In Table 10, CLK_A is equal to the logical AND of CK1248D and CK1248; CLK_B is equal to the logical AND of CK1248D and CK1248#; and CLK_C is equal to the logical AND of CK1248# and CK1248D#. These clock signals are illustrated in FIG. 11. Turning to FIG. 8, these enable and select values have the following effect in receive variable-width interface 800. The logic "1" enable signals EK4_7, EK2_3 and EK1 enable flip-flops K1–K7. The CLK_A, CLK_B and CLK_C signals sequentially enable flip-flop sets J6–J7, J4-J5, and J2–J3, respectively. Successive rising edges of the CK2 signal (starting with the second rising edge of the CK2 signal after a rising edge of the CK1248 signal) latch data signals Q1 and Q0 into: flip-flops J7 and J6 (at time T2 in FIGS. 10D and 11); then flip-flops J5 and J4 (at time T3 in FIGS. 10D and 11); and then flip-flops J3 and J2 (at time T4 in FIGS. 10D and 11). The edge of the CK2 signal that stores data signals Q1 and Q0 into flip-flops J3 and J2 also latches new values Q1 and Q0, which propagate directly to flip-flops K1 and K0 sufficiently fast to satisfy the setup time requirements of R1 and R0, prior to the next rising edge of the CK1248 signal. The next rising edge of the CK1248 signal then stores the data values R7–R0 into flip-flops K7–K0, which are then provided as output data value R[7:0]. The timing of interface 800 for an 8-bit data path is illustrated in FIG. 10D.

By changing the values of data width selectors Y1, Y2, Y4 and Y8, interface 800 can be configured to operate using any of several supported data widths. Separate data width selectors may be provided for transmit variable-width interface 400 and receive variable-width interface 800. In one embodiment using a programmable FPGA environment, interfaces 400 and 800 advantageously avoid the use of programmable resources for the implementation of these interfaces, thereby enabling these interfaces to be implemented in an efficient manner. In another embodiment the programmable resources of the FPGA may be used to allow use of the data-width converters for more applications.

Variations on the above implementations are possible. For example, the clock waveforms of FIGS. 3A–3D may be defined differently, depending on whether the data paths are positive-edge or negative-edge triggered, and whether it is required to avoid hold-time design issues.

The implementation of interface 400 described in connection with FIGS. 4 and 5 assume that the input data value D[7:0] should be provided directly to flip-flop inputs. If it is permissible to go to flip-flop inputs via minimal logic (i.e., a multiplexer), then flip-flops A1 and A01 may be merged into a single flip-flop, with other suitable modifications to the design. Such modifications would include the addition of a multiplexer that provides either the D[1] or D[0] data signal to the merged flip-flop, depending on the configuration of the data path.

The implementation described in FIGS. 8 and 9 makes certain assumptions about propagation delays from the source of Q[1:0]. Different assumptions might lead to not propagating Q[1:0] directly to flip-flops K1 and K0 for the 2-bit, 4-bit, and 8-bit data paths, or conversely, to bypassing flip-flops J2 and J3 for the 1-bit data path. Similarly, assumptions about propagation delays from P[1:0] in FIG. 4 could lead to bypassing flip-flops B1 and/or B0 in some cases.

The implementation in FIG. 8 defined the enable inputs so that each of flip-flops J2–J7 is written at most once per CK1248 cycle. An alternative design style would be to organize flip-flops J2–J7 as a shift register, unconditionally loaded (shifted) by each rising edge of CK2 and periodically loaded into flip-flops K0–K7 by the rising edge of CK1248. It is also possible to use a shift register methodology in transmit variable-width interface 400 of FIG. 4 as well.

In addition, interfaces 400 and 800 may be extended to support other data widths, or it may be constrained to support only a subset of the data widths.

Although the invention has been described in connection with several embodiments, it is understood that this invention is not limited to the embodiments disclosed, but is capable of various modifications, which would be apparent to a person skilled in the art. Logically equivalent but structurally different implementations are possible. Moreover, other variations in design style or detail may be possible. Thus, the invention is limited only by the following claims.

I claim:

1. An integrated circuit (IC) comprising:
   programmable circuitry having programmable functions and programmable interconnections, the programmable circuitry comprising a first transmit port having a first fixed data width or a first variable data width, and a first receive port having a second fixed data width or a second variable data width;
   a transceiver comprising a second transmit port having a third fixed data width or a third variable data width, and a second receive port having a fourth fixed data width or a fourth variable data width; and
   a transmit converter coupling the first transmit port of the programmable circuitry and the second receive port of the transceiver, the transmit converter operably configured to convert the first fixed data width to the fourth variable data width, the first variable data width to the fourth fixed data width, or the first variable data width to the fourth variable data width.

2. The IC of claim 1 further comprising,
   a receive converter coupling the first receive port of the programmable circuitry and the second transmit port of the transceiver.

3. The IC of claim 2, wherein the receive converter is operably configured to convert the third fixed data width to the second variable data width, the third variable data width to the second fixed data width, or the third variable data width to the second variable data width.

4. The IC of claim 3, wherein a particular variable data width port has a data width that is a multiple of a data width of another particular variable data width port or a particular fixed data width port, or a specific fixed data width port has a data width that is a multiple of a data width of a specific variable data width port.

5. The IC of claim 3, wherein the receive converter comprises:
   a first set of registers coupled to receive data of width N from the second transmit port of the transceiver, wherein the first set of registers is clocked by a first clock signal having a frequency f1, wherein N is an integer; and
   a set of multiplexers coupled to the first set of registers, wherein the set of multiplexers is coupled to the first receive port of the programmable circuitry.

6. The IC of claim 5, further comprising a second set of registers coupled to the set of multiplexers for receiving data of data width M, wherein the second set of registers is clocked by a second clock signal having a frequency f2, and wherein M is an integer.

7. The IC of claim 1, wherein the transmit converter comprises:
   a first set of registers coupled to receive data of width N from the first transmit port of the programmable circuitry, wherein the first set of registers is clocked by a first clock signal having a frequency f1, wherein N is an integer; and
   a set of multiplexers coupled to the first set of registers, wherein the set of multiplexers is coupled to the second receive port of the transceiver.

8. The IC of claim 7, further comprising a second set of registers coupled to the set of multiplexers for receiving data of data width M, wherein the second set of registers is clocked by a second clock signal having a frequency f2, and wherein M is an integer.

9. An integrated circuit (IC) comprising programmable circuitry having programmable functions and programmable interconnections, the IC further comprising:
   a first module having an output with a first variable data width;
   a second module having an input with a fixed data width or a second variable data width; and
   a data width converter receiving data from the output of the first module and sending the data to the input of the second module, the data width converter configured to convert data from the first variable data width to the fixed data width or the second variable data width.

10. The IC of claim 9 wherein the first module comprises circuitry selected from a group consisting of a serdes circuit, a transceiver, an I/O block, a microprocessor, and a configurable logic block (CLB).

11. An integrated circuit (IC) comprising programmable circuitry having programmable functions and programmable interconnections, the IC further comprising:
   a first module having an output with a fixed data width;
   a second module having an input with a variable data width; and
   a data width converter receiving data from the output of the first module and sending the data to the input of the second module, the data width converter configured to convert data from the fixed data width to the variable data width.

12. An integrated circuit (IC) comprising:
   a deserializer circuit for converting data from a serial format to a parallel format;
   a data bus having a fixed data path width coupled to the deserializer circuit;
   a variable width interface coupled to the data bus, the variable width receiver interface configured to convert data having the fixed data path width to data having a selectable data path width; and
   a circuit having programmable functions and programmable interconnections, the circuit receiving the data having the selectable data path width.

13. The IC of claim 12, wherein selectable data path width is selected from a group consisting of 1N, 2N, 4N, and 8N, wherein N is a positive integer.

14. A device comprising:

a circuit having programmable functions coupled to a variable data width interface by programmable interconnections, the programmable interconnections forming a first data path having a first variable data width selectable from a plurality of data widths, wherein the variable data width interface converts the first data path to a second data path, the second data path having a fixed data width or a second variable data width; and a serializer circuit configured to transform data from a parallel format to a serial format, the serializer circuit coupled to the second data path.

15. The device of claim 14 further comprising:

a transmit processing block interposed between the variable width interface and the serializer circuit, the transmit processing block receiving data from the second data path and sending the data via a third data path having another fixed data width.

16. The device of claim 14 wherein the second data path has programmable interconnections.

* * * * *